United States Patent
Lee et al.

(10) Patent No.: US 10,635,223 B2
(45) Date of Patent: Apr. 28, 2020

(54) ELECTRONIC APPARATUS AND OPERATING METHOD THEREOF

(71) Applicant: Samsung Electronics Co., Ltd., Gyeonggi-do (KR)

(72) Inventors: Hye-Jin Lee, Seoul (KR); Donggoo Kang, Seoul (KR); Changwon Kim, Gyeonggi-do (KR); Hyunkyung Kim, Seoul (KR); Joohee Park, Seoul (KR); Seonwoo Yoo, Seoul (KR); Sangah Lee, Gyeonggi-do (KR); Bokun Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 74 days.

(21) Appl. No.: 15/643,093

(22) Filed: Jul. 6, 2017

(65) Prior Publication Data
US 2018/0011590 A1    Jan. 11, 2018

(30) Foreign Application Priority Data

Jul. 6, 2016    (KR) .................. 10-2016-0085635

(51) Int. Cl.
*G06K 9/00* (2006.01)
*G06F 3/041* (2006.01)
*G06F 3/038* (2013.01)

(52) U.S. Cl.
CPC ............ *G06F 3/0416* (2013.01); *G06F 3/038* (2013.01); *G06K 9/00013* (2013.01); *G06K 9/00087* (2013.01); *G06K 9/00355* (2013.01); *G06F 2203/0338* (2013.01)

(58) Field of Classification Search
None
See application file for complete search history.

(56) References Cited

U.S. PATENT DOCUMENTS

| 8,745,490 B2 | 6/2014 | Kim |
| 10,051,177 B2 * | 8/2018 | Kim ...................... A61B 5/024 |
| 2008/0042983 A1 | 2/2008 | Kim et al. |

(Continued)

FOREIGN PATENT DOCUMENTS

| JP | 2009015543 | 1/2009 |
| KR | 20150109862 | 10/2015 |

(Continued)

OTHER PUBLICATIONS

International Search Report dated Oct. 30, 2017 issued in counterpart application No. PCT/KR2017/006769, 10 pages.

(Continued)

*Primary Examiner* — Hadi Akhavannik
(74) *Attorney, Agent, or Firm* — The Farrell Law Firm, P.C.

(57) ABSTRACT

An apparatus and method are provided for controlling an operation of an electronic device by using a fingerprint image in the electronic device. The electronic device includes a display and a processor configured to detect a fingerprint image corresponding to a user input; determine an input direction of the user input based on the fingerprint image; determine a motion direction of the user input based on the input direction of the user input in response to a motion of the user input; and execute a first function corresponding to the motion direction of the user input.

20 Claims, 27 Drawing Sheets

(56) References Cited

U.S. PATENT DOCUMENTS

| | | |
|---|---|---|
| 2012/0182253 A1 | 7/2012 | Brosnan |
| 2013/0173925 A1 | 7/2013 | Yen et al. |
| 2015/0016695 A1 | 1/2015 | Yoon |
| 2015/0078586 A1* | 3/2015 | Ang .................. H03G 1/00 381/109 |
| 2015/0139511 A1 | 5/2015 | Yoon et al. |
| 2015/0271175 A1 | 9/2015 | Je et al. |
| 2015/0324570 A1 | 11/2015 | Lee et al. |
| 2015/0363632 A1 | 12/2015 | Ahn et al. |
| 2015/0371073 A1* | 12/2015 | Cho .................. G06F 3/0488 382/124 |
| 2016/0026321 A1 | 1/2016 | Yeo et al. |
| 2016/0188023 A1 | 6/2016 | Chang et al. |
| 2016/0306543 A1* | 10/2016 | Bang ................. G06F 3/04883 |
| 2017/0308227 A1* | 10/2017 | Park .................. G06F 3/0416 |

FOREIGN PATENT DOCUMENTS

| | | |
|---|---|---|
| KR | 20150144666 | 12/2015 |
| KR | 20160011538 | 2/2016 |
| KR | 20160016397 | 2/2016 |
| WO | WO 2008/033264 | 3/2008 |

OTHER PUBLICATIONS

Holz, Christian and Baudisch, Patrick, "Fiberio: A Touchscreen that Senses Fingerprints", UIST'13, Oct. 8-11, 2013, St. Andrews, UK, pp. 41-50.

European Search Report dated Feb. 21, 2019 issued in counterpart application No. 17824439.8-1207, 10 pages.

European Search Report dated Dec. 16, 2019 issued in counterpart application No. 17824439.8-1207, 6 pages.

\* cited by examiner

ELECTRONIC APPARATUS AND OPERATING METHOD THEREOF

PRIORITY

This application claims priority under 35 U.S.C. § 119(a) to Korean Patent Application Serial No. 10-2016-0085635, which was filed in the Korean Intellectual Property Office on Jul. 6, 2016, the entire disclosure of which is incorporated herein by reference.

BACKGROUND

1. Field of the Disclosure

Various embodiments of the present disclosure relate to an apparatus and method for controlling a function of an electronic device by using a fingerprint image in the electronic device.

2. Description of the Related Art

An electronic device may store various types of personal information such as phone numbers and authentication information (e.g., passwords). Accordingly, the electronic device may provide an authentication service to protect the stored personal information. For example, the electronic device may provide a biometric authentication service using biometric information such as an iris scan, a fingerprint, a face image, a palm print, a vein image, etc.

SUMMARY

The electronic device may acquire biometric information (e.g., a fingerprint) of a user for a user authentication by using a biometrics sensor (e.g., a fingerprint sensor) operatively connected to the electronic device. For example, upon detecting a user input for the user authentication, the electronic device may activate the fingerprint sensor and acquire fingerprint information of the user.

However, because the electronic device requires a plurality of user inputs to perform the user authentication by using the biometric information, this may inconvenience the user.

In addition, because the electronic device uses the biometric information of the user only to perform user authentication, there may be a problem in that the biometric information is utilized by the user in a limited manner.

Accordingly, the present disclosure is designed to address at least the problems and/or disadvantages described above and to provide at least the advantages described below.

An aspect of the present disclosure is to provide an apparatus and method for providing various user interfaces by using fingerprint information for a user input in an electronic device.

In accordance with an aspect of the present disclosure, an electronic device is provided, which includes a display, and a processor configured to detect a fingerprint image corresponding to a user input; determine an input direction of the user input based on the fingerprint image; determine a motion direction of the user input based on the input direction of the user input in response to a motion of the user input; and execute a first function corresponding to the motion direction of the user input.

In accordance with another aspect of the present disclosure, a method is provided for operating an electronic device, which includes detecting a user input; detecting a fingerprint image corresponding to the user input; determining an input direction of the user input based on the fingerprint image; determining a motion direction of the user input based on the input direction of the user input in response to a motion of the user input; and executing a first function corresponding to the motion direction of the user input.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE DISCLOSURE

Figure 1A:
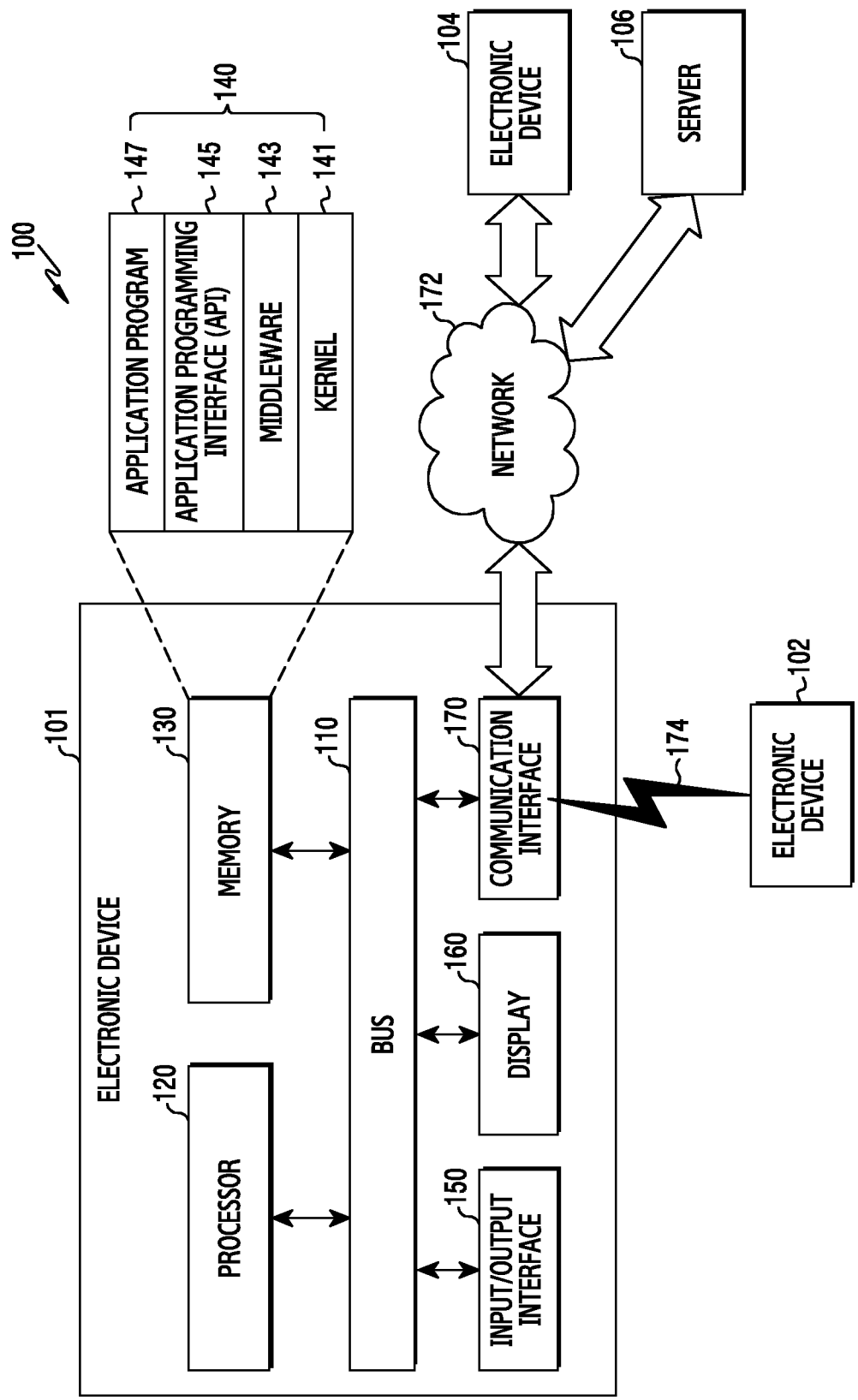
FIG. 1A illustrates an electronic device in a network environment according to an embodiment of the present disclosure.

Hereinafter, various embodiments of the present disclosure are described with reference to the accompanying drawings. The present disclosure, however, is not limited to the various embodiments described herein, but covers all modifications, equivalents, and alternatives falling within the spirit and scope of the embodiments described herein.

Throughout the drawings and descriptions, like reference numerals may denote like components.

A singular expression includes a plural concept unless there is a contextually distinctive difference therebetween.

The expressions "A or B", "A and/or B", etc., may include all possible combinations of items enumerated together.

Although expressions such as "$1^{st}$", "$2^{nd}$", "first", and "second" may be used to express corresponding elements, they are not intended to limit the corresponding elements.

When a $1^{st}$ element is described as being "operatively or communicatively coupled with/to" or "connected to" a $2^{nd}$ element, the $1^{st}$ element may by directly coupled with/to the $2^{nd}$ element or another element, (e.g., a $3^{rd}$ element) may be connected therebetween.

The expression "configured to" may be interchangeably used with, for example, "suitable for", "having the capacity to", "adapted to", "made to", "capable of", or "designed to" in a hardware or software manner according to context. For example, "a device configured to" may indicate that the device is "capable of" together with other devices or components. "A processor configured to perform A, B, and C" may indicate a dedicated processor (e.g., an embedded processor) for performing a corresponding operation or a generic-purpose processor (e.g., central processing unit (CPU) or an application processor (AP)) capable of performing corresponding operations by executing one or more software programs stored in a memory device.

An electronic device according to an embodiments of the present disclosure may include a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

An electronic device may also include a home appliance, such as a television, a Digital Video Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™, an electronic dictionary, an electronic key, a camcorder, and an electronic photo frame.

An electronic device may include a medical device (e.g., a portable medical measuring device, such as a blood glucose monitoring device, a heart rate monitoring device, a blood pressure measuring device, a body temperature measuring device, etc.), a magnetic resonance angiography (MRA) device, a magnetic resonance imaging (MRI) device, a computed tomography (CT) machine, and an ultrasonic machine, a navigation device, a global positioning system (GPS) receiver, an event data recorder (EDR), a flight data recorder (FDR), a vehicle infotainment device, an electronic device for a ship (e.g., a navigation device and a gyrocompass), an avionics device, a security device, an automotive head unit, a robot for home or industry, an automatic teller machine (ATM), a point of sales (POS) device, or an Internet of things (IoT) device (e.g., a light bulb, a sensor, an electric or gas meter, a sprinkler device, a fire alarm, a thermostat, a streetlamp, a toaster, sporting goods, a hot water tank, a heater, a boiler, etc.).

An electronic device may also include at least one of a part of furniture or a building/structure, an electronic board, an electronic signature receiving device, a projector, and various kinds of measuring instruments (e.g., a water meter, an electric meter, a gas meter, and a radio wave meter).

An electronic device may be a flexible device (or foldable device).

An electronic device according to an embodiment of the present disclosure may be a combination of the aforementioned devices. However, an electronic device according to an embodiment of the present disclosure is not limited to the aforementioned devices, and may include a new electronic device according to the development of new technology.

Herein, the term "user" may indicate a person who uses an electronic device or a device (e.g., an artificial intelligence electronic device) that uses an electronic device.

FIG. 1A illustrates an electronic device in a network environment according to an embodiment of the present disclosure.

Referring to FIG. 1A, an electronic device 101 includes a bus 110, a processor 120 (e.g., including processing circuitry), a memory 130, an input/output interface 150 (e.g., including input/output circuitry), a display 160 (e.g., including display circuitry), and a communication interface 170 (e.g., including communication circuitry). Alternatively, the electronic device 101 may omit at least element or may additionally include other elements.

The bus 110 may include a circuit for connecting the elements 120 to 170 and for delivering signals (e.g., a control message/and or data) between the elements.

The processor 120 may include a CPU, an AP, a communication processor (CP), and/or an image signal processor (ISP). The processor 120 may execute an arithmetic operation or data processing relating to the control and/or communication of at least one different element of the electronic device 101.

The processor 120 may acquire a fingerprint image corresponding to a user input caused by a contact of the display 160. For example, upon detecting the user input (e.g., a touch input, a pressure input) caused by the contact of the display 160 in a low power mode of the electronic device 101, the processor 120 may acquire the fingerprint image corresponding to the user input by using a touch panel or a fingerprint sensor.

The processor 120 may determine a user input direction by using the fingerprint image corresponding to the user input. For example, the processor 120 may rotate a reference image in unit of a reference interval (e.g., 1 degree) to detect a similarity with the fingerprint image for each reference interval. The processor 120 may select a rotation angle of the reference image capable of detecting a greatest similarity among the similarities with the fingerprint image exceeding a reference similarity. The processor 120 may determine the user input direction based on the rotation angle of the reference image capable of detecting the greatest similarity.

For example, the processor 120 may sequentially rotate the reference image in unit of the reference interval to detect the similarity with the fingerprint image corresponding to the user input.

Upon detecting the similarity with the fingerprint image exceeding the reference similarity, the processor 120 may determine the user input direction based on the rotation angle of the reference image capable of detecting the similarity. For example, upon detecting the user input during operating in the low power mode, the processor 120 may detect motion information of the electronic device 101. The processor 120 may rotate the reference image so as to correspond to the motion information of the electronic device 101, and thus, may detect the similarity with the fingerprint image corresponding to the user input.

If the similarity with the fingerprint image exceeds the reference similarity, the processor 120 may determine the user input direction based on the rotation angle of the reference image capable of detecting the similarity. Additionally or alternatively, if the similarity with the fingerprint image exceeding the reference similarity cannot be detected, the processor 120 may determine that the user input direction cannot be detected by using the fingerprint image. For example, the processor 120 may detect the motion information of the electronic device 101 by using at least one sensor (e.g., a geomagnetic sensor, an acceleration sensor, a gyro sensor, etc.) operatively connected to the electronic device 101. For example, the processor 120 may compare the entirety or at least one part of an area of the reference image and the fingerprint image in unit of a pixel to detect the similarity of the reference image and the fingerprint image, or may compare feature points of the reference image and the fingerprint image to detect the similarity of the reference image and the fingerprint image. The feature point of the fingerprint image may include a fingerprint shape for identifying a fingerprint such as an arch, a whirl, a loop, etc.

Upon determining the user input direction, the processor 120 may output executable information of a function corresponding to a motion direction based on a motion of the user input. For example, the processor 120 may control the display 160 to display a motion direction to which the function is mapped based on the user input direction and function information (e.g., an icon) mapped to the motion direction so as to be identified by the user. Upon determining the user input direction, the processor 120 may output the executable information of the function corresponding to the motion direction in form of vibration or sound.

The processor 120 may provide control to perform a function corresponding to the user input direction and the motion information of the user input. Upon detecting the motion of the user input, the processor 120 may determine the motion direction of the user input based on the user input direction. The processor 120 may perform a function mapped to the motion direction of the user input. For example, if there is an application which is running in the electronic device 101, the processor 120 may perform the function mapped to the application and the motion direction of the user input. The processor 120 may perform a function mapped to a location (e.g., a coordinate) at which the user input is detected and the motion direction of the user input. The function mapped to the motion direction of the user input may include at least one of an application execution, a content playback control, a notification information display, and an external device control. Additionally or alternatively, the processor 120 may output execution information of the function mapped to the motion direction in form of graphic, vibration, or sound.

The processor 120 may provide control to execute an additional function associated with a function being executed based on an additional user input while executing the function corresponding to the motion direction of the user input. For example, if a user input value (e.g., a touch area, a pressure intensity, the number of pressure inputs, the number of touches, the number of pressures, etc.) is changed while the user input for determining the motion direction is maintained, the processor 120 may determine that the additional user input is detected. The processor 120 may determine whether the additional user input is detected until a reference time elapses from a time of detecting the motion direction of the user input. Upon detecting the additional user input, the processor 120 may perform a function being executed in the electronic device 101 and an additional function corresponding to the additional user input.

The memory 130 may include a volatile and/or non-volatile memory. The memory 130 may store a command or data related to at least one another element of the electronic device 101. The memory 130 stores a software and/or program 140. The program 140 includes a kernel 141, a middleware 143, an application programming interface (API) 145, and an application program (or "application") 147. At least some of the kernel 141, the middleware 143, or the API 145 can be referred to as "an operating system (OS)".

The kernel 141 may control or manage system resources (e.g., the bus 110, the processor 120, the memory 130, etc.) that are used for executing operations or functions implemented in other programs (e.g., the middleware 143, the API 145, or the application 147). The kernel 141 may provide an interface that is capable of controlling or managing the system resources by allowing the middleware 143, the API 145, or the application 147 to gain access to the individual element of the electronic device 101.

The middleware 143 may act as a relay for allowing the API 145 or the application 147 to communicate and exchange data with the kernel 141. The middleware 143 may process one or more work requests received from the application 147 in accordance with the order of priority. The middleware 143 may grant at least one of the applications 147 the order of priority capable of using the system resources (e.g., the bus 110, the processor 120, the memory 130, etc.) of the electronic device 101, and process the one or more work requests. The API 145 is an interface of the application 147 to control a function of the kernel 141 or the middleware 143, and may include at least one interface or function (e.g., instruction) for file control, window control, picture processing, character control, etc.

The input output interface 150 may act as an interface for forwarding a command or data that is input from a user or another external device, to another element(s) of the electronic device 101.

The display 160 may include a liquid crystal display (LCD), a light emitting diode (LED) display, an organic light-emitting diode (OLED) display, a micro electro mechanical system (MEMS) display, or an electronic paper display. The display 160 may display a variety of content (e.g., a text, an image, a video, an icon, a symbol, etc.) for the user.

The display 160 may include a display panel, a touch panel, and a pressure panel. The display 160 may receive a touch, gesture, proximity, or hovering input by using an electronic pen or a part of a user's body through the touch panel. The touch panel may detect a fingerprint image of the user by increasing a resolution of a coordinate capable of detecting a user input (touch) in an electrostatic capacitance manner. The display panel may include a plurality of pixels and a plurality of light receiving modules for receiving external light. The display panel may detect the fingerprint image of the user by collecting a value of light emitted from the plurality of pixels and reflected from the part of the user's body via the light receiving module. The light receiving module may be arranged so as to correspond to at least one pixel. The display 160 may receive a pressure input caused by a conductor (e.g., the part of the user's body) or a non-conductor via the pressure panel.

The communication interface 170 may configure communication between the electronic device 101 and a first external electronic device 102, a second external electronic device 104, and/or a server 106. The communication interface 170 may be connected to a network 172 through wireless communication or wired communication to communicate with the second external electronic device 104 or the server 106.

The wireless communication may include cellular communication such as Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), etc.

The wireless communication 174 may include WiFi, light fidelity (LiFi), Bluetooth (BT), Bluetooth Low Energy (BLE), Zigbee, Near Field Communication (NFC), Magnetic Secure Transmission (MST), Radio Frequency (RF), Body Area Network (BAN) and/or Global Navigation Satellite System (GNSS).

The wired communication can include at least one of a Universal Serial Bus (USB), a High Definition Multimedia Interface (HDMI), Recommended Standard-232 (RS-232), Power Line Communication (PLC), Plain Old Telephone Service (POTS), etc.

The network 172 may include at least one of a telecommunications network, for example, a computer network (e.g., a Local Area Network (LAN) or a Wide Area Network (WAN)), the Internet, or a telephone network.

Each of the first and second external electronic devices 102 and 104 may be the same type as or different from the electronic device 101.

The server 106 may include a group of one or more servers.

All or some of the operations performed in the electronic device 101 may be performed in the electronic devices 102 and 104 and/or the server 106. For example, when the electronic device 101 has to perform some functions or services, the electronic device 101 may request at least some functions relating thereto be performed by the electronic devices 102 and 104, and/or the server 106, instead of performing the functions or services itself. The electronic devices 102 and 104, and/or the server 106 may execute the requested functions or the additional functions, and may deliver a result of the execution to the electronic device 101. The electronic device 101 may process the received result as it is or additionally to provide the requested functions or services. For example, cloud computing, distributed computing, or client-server computing technology may be used.

Figure 1B:
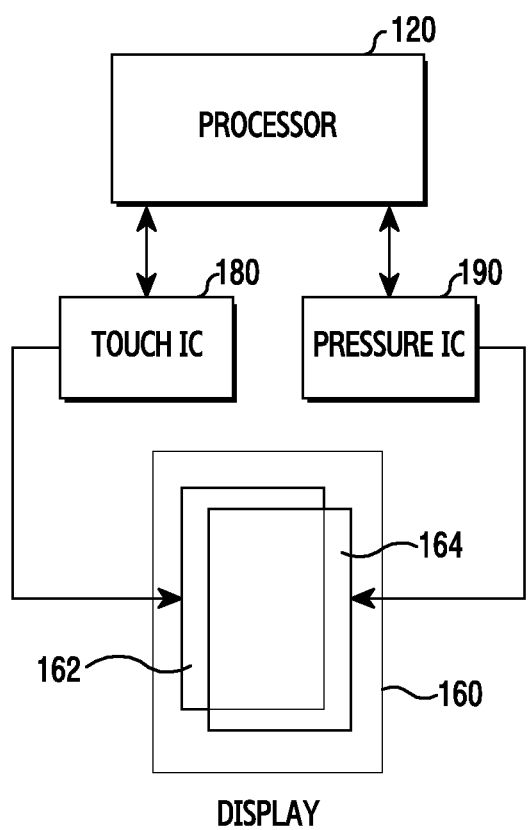
FIG. 1B illustrates an electronic device for processing input information according to an embodiment of the present disclosure.

FIG. 1B illustrates an electronic device for processing input information according to an embodiment of the present disclosure.

Referring to FIG. 1B, the electronic device 101 includes a processor 120, a display 160, a touch integrated circuit (IC) 180, and a pressure IC 190.

The display 160 includes a display panel for displaying a variety of content, a touch panel 162 for recognizing a touch signal, and a pressure panel 164 for recognizing a pressure.

The touch IC 180 may generate a touch event corresponding to touch information (e.g., a touch coordinate) of a touch input detected via the touch panel 162.

The pressure IC 190 may generate a pressure event corresponding to pressure information (e.g., a pressure coordinate, a pressure intensity) detected via the input panel 164. For example, upon detecting the touch input via the touch IC 180, the pressure IC 190 may generate a pressure event corresponding to a pressure intensity for the touch input. For example, the pressure IC 190 may generate a pressure event corresponding to the pressure information separately from the touch IC 180.

The processor 120 may match and process the touch event and the pressure event which are provided form the touch IC 180 and the pressure IC 190. For example, if generation information of the touch event is provided from the touch IC 180, the processor 120 may provide control to perform an operation or function corresponding to the touch coordinate through an application. If generation information of the pressure event is provided from the pressure IC 190, the processor 120 may provide control to perform an operation or function corresponding to the pressure coordinate and the pressure intensity through the application. If the generation information of the touch event and the pressure event is provided from the touch IC 180 and the pressure IC 190, the processor 120 may provide control to perform an operation or function corresponding to the touch coordinate and the pressure intensity. The processor 120 may match the touch event and the pressure event by using the touch coordinate and the pressure coordinate.

Alternatively, the touch IC 180 and the pressure IC 190 may be constructed as one module.

Figure 2:
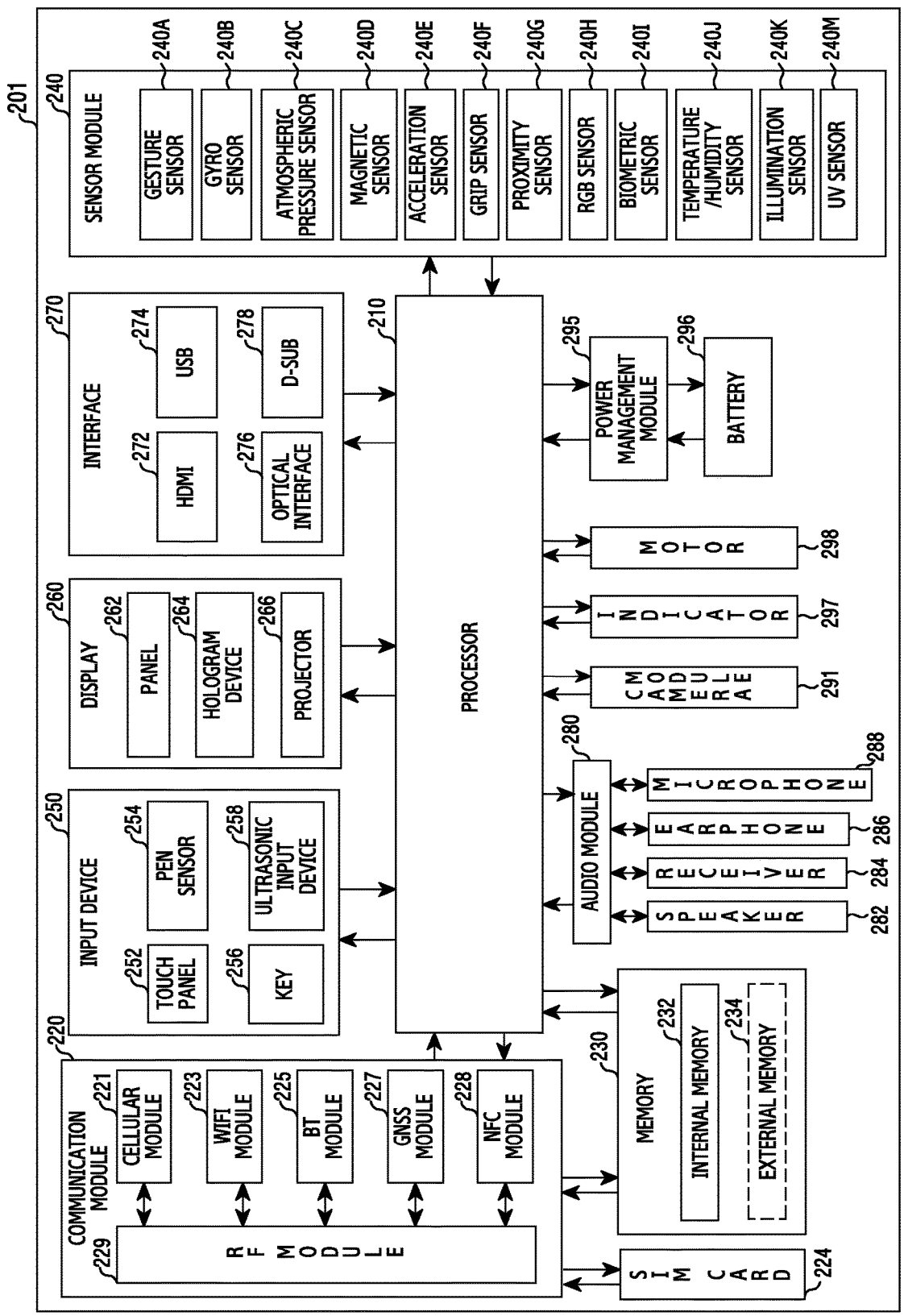
FIG. 2 illustrates an electronic device according to an embodiment of the present disclosure.

FIG. 2 illustrates an electronic device according to an embodiment of the present disclosure. The electronic device 201 may include, for example, all or some parts of the electronic device 101 of FIG. 1A.

Referring to FIG. 2, the electronic device 201 includes a processor (e.g., an AP) 210, a communication module 220, a subscriber identity card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected to the processor 210 by driving, for example, an OS or an application program, and may process a variety of data including multimedia data and may perform an arithmetic operation. The processor 210 may be implemented with a System on Chip (SoC). The processor 210 may include a graphic processing unit (GPU) and/or an ISP. The processor 210 may include at least one part of the aforementioned elements of FIG. 2 (e.g., a cellular module 221). The processor 210 may load, in a volatile memory, instructions or data received from at least one of the other elements (e.g., a non-volatile memory), process the loaded instructions or data, and store resultant data in the non-volatile memory.

Upon detecting a user input in a low power mode, the processor 210 may control an operation of the electronic device by using a fingerprint image corresponding to the user input. For example, the processor 210 may determine a user input direction by using the fingerprint image corresponding to the user input. Upon detecting a motion of the user input, the processor 210 may determine a motion direction of the user input based on the user input direction. The processor 210 may provide control to perform a function corresponding to the motion direction of the user input.

The communication module 220 (for example, the communication interface 170) includes the cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide a voice call, a video call, a text message service, an Internet service, etc., through a communication network. The cellular module 221 may identify and authenticate the electronic device within a communication network using the SIM card 224. The cellular module 221 may perform at least some of the functions that the processor 210 may provide. The cellular module 221 may include a CP.

The Wi-Fi module 223, the BT module 225, the GNSS module 227, or the NFC module 228 may include a processor for processing data that is transmitted and received through the corresponding module. At least two of the cellular module 221, the Wi-Fi module 223, the Bluetooth module 225, the GNSS module 227, and the NFC module 228 may be included in one integrated chip or integrated chip package.

The RF module 229 may transmit and receive a communication signal (e.g., an RF signal). The RF module 229 may include a transceiver, a power amplifier module (PAM), a frequency filter, a low noise amplifier (LNA), an antenna, etc. At least one of the cellular module 221, the Wi-Fi module 223, the Bluetooth module 225, the GNSS module 227, and the NFC module 228 may transmit and receive an RF signal through a separate RF module.

The SIM card 224 may include a card including an SIM and/or an embedded SIM and may include unique identification information (e.g., an integrated circuit card identifier (ICCID)) or subscriber information (e.g., an international mobile subscriber identity (IMSI)).

The memory 230 (for example, a memory 130) includes an internal memory 232 and an external memory 234. The internal memory 232 may include a volatile memory (e.g., a dynamic random-access memory (DRAM), a static RAM (SRAM), a synchronous dynamic RAM (SDRAM), etc.) and/or a nonvolatile memory (e.g., a one-time programmable read-only memory (OTPROM), a programmable ROM (PROM), an erasable and programmable ROM (EPROM), an electrically erasable and a programmable ROM (EEPROM), a mask ROM, a flash ROM, a flash memory (for example, an NAND flash, an NOR flash, etc.), a hard drive, or a solid state drive (SSD)).

The external memory 234 may further include a flash drive, a compact flash (CF), a secure digital (SD), a micro secure digital (micro-SD), a mini secure digital (mini-SD), an extreme digital (xD), a multi-media card (MMC), a memory stick, etc. The external memory 234 may be functionally and/or physically connected to the electronic device 201 through various interfaces.

The sensor module 240 may measure physical quantities or detect an operation state of the electronic device 201 and convert measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a red, green, and blue (RGB) sensor 240H, a biometric sensor 240I, a temperature/humidity sensor 240J, a illumination sensor 240K, and a ultraviolet (UV) sensor 240M. Additionally or alternatively, the sensor module 240 may include a galvanic skin reflex (GRS) sensor, an E-nose sensor, an electromyography (EMG) sensor, an electroencephalogram (EEG) sensor, an electrocardiogram (ECG) sensor, an infrared (IR) sensor, an iris sensor, a force touch sensor, an ultrasonic sensor, and/or a fingerprint sensor. The sensor module 240 may further include a control circuit to control at least one or more sensors belonging thereto.

Alternatively, the electronic device 201 may further include a processor configured, as a part of the processors 210 or separately from the processors 210, to control the sensor module 240, thereby controlling the sensor module 240 while the processor 210 is in a sleep state.

The input device 250 includes a touch panel 252, a (digital) pen sensor 254, a key 256, and an ultrasonic input device 258. The touch panel 252 may use at least one of an electrostatic type, a pressure-sensitive type, an infrared type, and an ultrasonic type. The touch panel 252 may further include a control circuit and/or a tactile layer to provide a user with a tactile response.

The (digital) pen sensor 254 may be part of the touch panel or include a separate recognition sheet. The key 256 may include a physical button, an optical key, and/or a keypad. The ultrasonic device 258 may detect ultrasonic waves generated in an input tool through a microphone (e.g., a microphone 288) and identify data corresponding to the detected ultrasonic waves.

The display 260 (e.g., the display 160) includes a panel 262, a hologram device 264, and a projector 266. The display 260 may also include a control circuit for controlling the panel 262, the hologram device 264, and/or the projector 266.

The panel 262 may be implemented to be flexible, transparent, or wearable. The panel 262 may be constructed as one or more modules together with the touch panel 252. The panel 262 may include a pressure sensor (or force sensor) capable of measuring pressure information (e.g., a pressure coordinate and a pressure strength) about a user's touch. The pressure sensor can be implemented in an integrated type with the touch panel 252, or be implemented as one or more sensors separate from the touch panel 252.

The hologram device 264 may use the interference of light to show a three-dimensional image to the air.

The projector 266 may project light onto a screen to display an image. The screen may be located inside or outside the electronic device 201.

The interface 270 includes an HDMI 272, a USB 274, an optical interface 276, and a D-subminiature (D-sub) 278. The interface 270 can, for example, be included in the communication interface 170 illustrated in FIG. 1A. Additionally or alternatively, the interface 270 may include a Mobile High-definition Link (MHL) interface, an SD card/Multi Media Card (MMC) interface, and/or an Infrared Data Association (IrDA) standard interface.

The audio module 280 may convert, for example, a sound and an electrical signal reciprocally. At least some components of the audio module 280 may be included, for example, in an input/output interface 150 illustrated in FIG. 1a. The audio module 280 may process sound information input or output, for example, through a speaker 282, a receiver 284, earphones 286, or the microphone 288.

The camera module 291 is a device that takes, for example, a still image and a video. According to one embodiment, the camera module 291 may include one or more image sensors (for example, a front sensor or a rear sensor), a lens, an ISP, or a flash (for example, an LED, a xenon lamp, etc.).

The power management module 295 may manage the power of the electronic device. The power management module 295 may include a power management IC (PMIC), a charger IC, or a battery gauge. The power management module 295 may be supplied with power from the outside via a cable and/or wirelessly. For example, the power management module 295 may be supplied with power from the outside using a wireless charging method, such as a magnetic resonance method, a magnetic induction method, or an electromagnetic wave method. The power management module 295 may further include an additional circuit, such as a coil loop, a resonance circuit, or a rectifier, to be supplied with power wirelessly. The battery gauge may measure the remaining battery charge, the charging voltage, the current, and/or temperature of the battery 296.

The battery 296 may include a rechargeable battery and/or a solar battery. The battery 296 may include a plurality of cells connectable in series or in parallel.

The indicator 297 may display a specific state of the electronic device 201 or a component thereof (e.g., the processors 210), such as a booting state, a message state, a charging state, etc.

The motor 298 may convert an electrical signal into mechanical vibrations and may generate vibrations or a haptic effect.

The electronic device 201 may include a processing device for supporting a mobile TV (e.g., a GPU). The processing device for supporting the mobile TV may process media data in accordance with digital multimedia broadcasting (DMB), digital video broadcasting (DVB), or mediaFlo™ standards.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
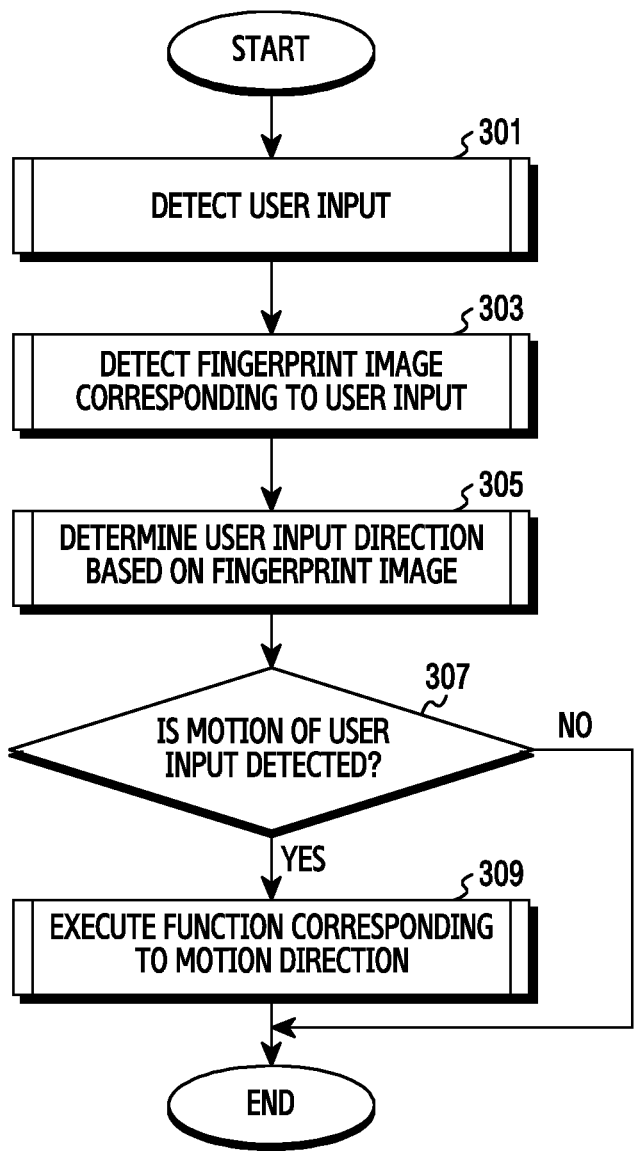
FIG. 3 is a flowchart illustrating a method of operating an electronic device according to an embodiment of the present disclosure.

FIG. 3 is a flowchart illustrating a method of executing a function in an electronic device according to an embodiment of the present disclosure. For example, the method of FIG. 3 will be described below as being performed by the electronic device 101 or at least a part (e.g., the processor 120) of the electronic device 101 illustrated in FIG. 1A or 1B.

Referring to FIG. 3, in operation 301, the electronic device detects a user input caused by a contact of a display 160. For example, the processor 120 may detect a touch input via a touch device (e.g., the touch panel 162 and the touch IC 180) while the display 160 (e.g., the display panel) is deactivated according to a low power mode. The processor 120 may detect a pressure input via a pressure device (e.g., the pressure panel 164 and the pressure IC 190) while the display 160 is deactivated according to the low power mode.

In operation 303, the electronic device detects a fingerprint image corresponding to the user input. For example, the processor 120 may detect the fingerprint image corresponding to the user input by using an electrostatic capacity type touch panel included in the display 160. The processor 120 may detect the fingerprint image corresponding to the user input by using a light receiving sensor and each pixel included in the display panel.

In operation 305, the electronic device determines a user input direction based on the fingerprint image. For example, to determine the user input direction, the processor 120 may detect the user input direction by rotating a pre-registered reference image. The processor 120 may detect the user input direction based on a rotation angle of the reference image capable of detecting a similarity with the fingerprint image exceeding a reference similarity. The processor 120 may detect the similarity with the fingerprint image by sequentially rotating the reference image in unit of a reference interval (e.g., 1 degree). The processor 120 may detect the similarity with the fingerprint image by rotating the reference image so as to correspond to a motion of the electronic device. Additionally or alternatively, upon determining the user input direction, the processor 120 may output executable information of a function corresponding to a motion of the user input in form of graphic, vibration, or sound.

In operation 307, the electronic device determines if the motion of the user input is detected. For example, the processor 120 may determine whether there is a change in a coordinate (e.g., a touch coordinate or a pressure coordinate) for the user input by which the fingerprint image is detected.

In operation 309, upon detecting the motion of the user input in operation 307, the electronic device executes a function corresponding to a motion direction of the user input. For example, upon detecting the motion of the user input, the processor 120 may determine the motion direction of the user input based on the user input direction. The processor 120 may provide control to perform a function matched to the motion direction of the user input. Additionally or alternatively, the processor 120 may select a function to be performed in the electronic device by additionally considering at least one of a location in which the user input is detected and information of an application which is running in the electronic device. The processor 120 may control the electronic device to perform at least one function among an application execution, a content playback control, a notification information display, and an external device control based on the motion direction of the user input.

Figure 4:
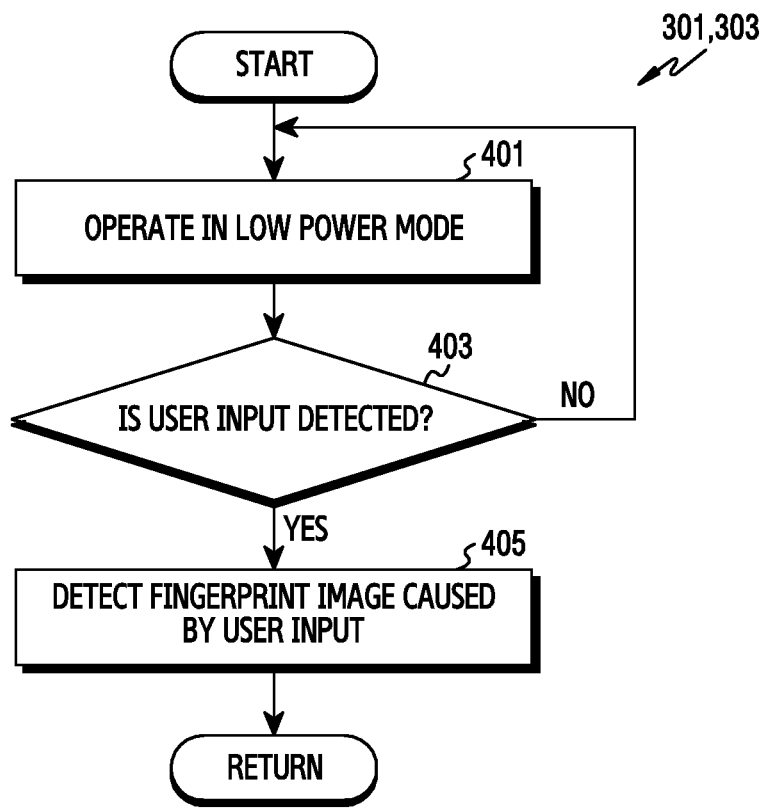
FIG. 4 is a flowchart illustrating a method of detecting a fingerprint image in an electronic device according to an embodiment of the present disclosure.

FIG. 4 is a flowchart illustrating a method of detecting a fingerprint image in an electronic device according to an embodiment of the present disclosure. For example, the method of FIG. 4 may be performed in operations 301 and 303 of FIG. 3. Hereinafter, the electronic device may include the electronic device 101 of FIG. 1A or 1B or at least a part (e.g., the processor 120) of the electronic device 101.

Referring to FIG. 4, in operation 401, the electronic device operates in a low power mode. For example, if a user input is not detected during a reference time, the processor 120 may switch the electronic device 101 to the low power mode to decrease power consumption. Alternatively, if an input for a power button is detected, the processor 120 may switch the electronic device 101 to the low power mode. If the electronic device is switched to the low power mode, the processor 120 may deactivate a display panel of the display 160.

In operation 403, the electronic device determines if a user input caused by a contact of a display is detected in the low power mode. For example, if the electronic device operates in the low power mode, the processor 120 may maintain an activate state of a touch panel or a pressure panel to detect the user input. The processor 120 may detect the user input (e.g., a touch input or a pressure input) via the touch panel or pressure panel, which maintains the active state. The touch input may include a user input for generating an electrostatic capacitance change exceeding a reference capacitance via the touch panel 162. The pressure input may include a user input for generating a pressure intensity exceeding a reference intensity via the pressure panel 164.

If the user input is not detected, the electronic device maintains the low power mode in operation 401.

In operation 405, upon detecting the user input, the electronic device detects a fingerprint image caused by the user input. For example, the processor 120 may detect the fingerprint image from the user input via an electrostatic capacitance type touch panel or display panel including a light emitting module for at least one pixel. Upon detecting the user input caused by the contact of the display in the low power mode, the processor 120 may activate the fingerprint sensor for detecting the fingerprint image.

Figure 5:
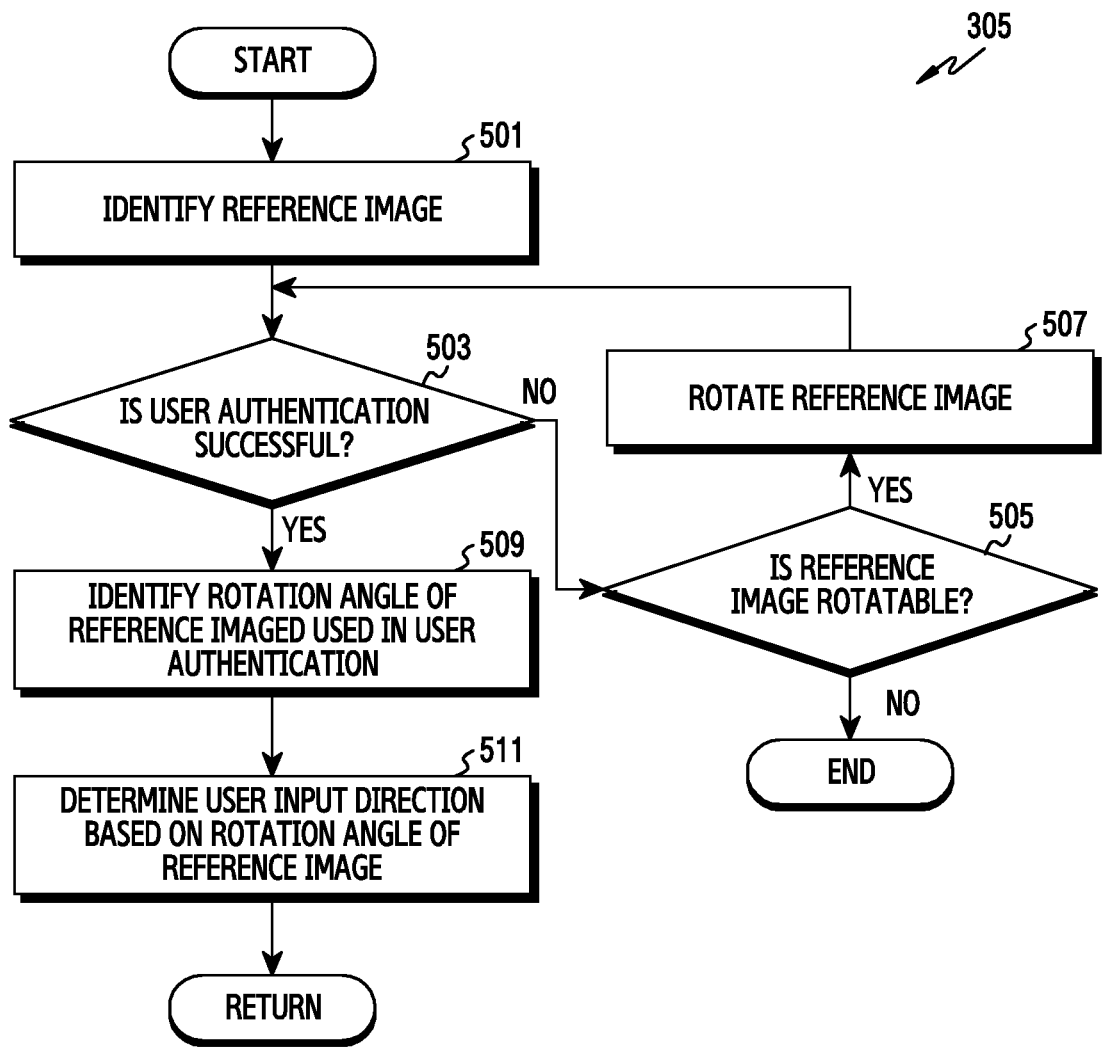
FIG. 5 is a flowchart illustrating a method of determining a user input direction in an electronic device according to an embodiment of the present disclosure.

FIG. 5 is a flowchart illustrating a method of determining a user input direction in an electronic device according to an embodiment of the present disclosure. For example, the method of FIG. 5 may be performed in operation 305 of FIG. 3. Hereinafter, the electronic device may include the electronic device 101 of FIG. 1A or 1B or at least a part (e.g., the processor 120) of the electronic device 101.

Referring to FIG. 5, in operation 501, upon detecting a fingerprint image corresponding to a user input (e.g., operation 303 of FIG. 3), the electronic device identifies a pre-set reference image to determine a user input direction. For example, the processor 120 may set a fingerprint image corresponding to the user input, which is input via a screen for registering the reference image, as the reference image and may store it into a memory or a server. Upon detecting the fingerprint image corresponding to the user input in the low power mode, the processor 120 may detect the reference image from the memory or the server.

In operation 503, the electronic device may determine whether a user authentication has succeeded by comparing the reference image and the fingerprint image corresponding to the user input. For example, the processor 120 may detect a similarity of the reference image and the fingerprint image. If the similarity with the fingerprint image exceeds a reference similarity, the processor 120 may determine that the user authentication has succeeded. If the similarity with the fingerprint image is less than or equal to the reference similarity, the processor 120 may determine that the user authentication has failed. For example, the processor 120 may compare the reference image and the fingerprint image in unit of a pixel or compare feature points of the reference image and the fingerprint image.

In operation 505, if the user authentication has failed in operation 503, the electronic device determines if the reference image is rotatable. For example, if the user authentication is attempted by detecting the similarity of the reference image and the fingerprint image with respect to all rotation angles rotatable in unit of a reference interval, the processor 120 may determine that the reference image is not additionally rotatable. In the presence of the rotation angle of the reference image for attempting the user authentication, the processor 120 may determine that the reference image is additionally rotatable.

If it is determined that the reference image is not additionally rotatable, the electronic device may output user authentication failure information. For example, the processor 120 may output the user authentication failure information by using at least one of a message, warning sound, vibration, and warning light (indicator) corresponding to the user authentication failure.

In operation 507, if it is determined that the reference image is additionally rotatable, the electronic device rotates the reference image by a reference interval.

In operation 503, the electronic device then compares the reference image rotated by the reference interval and the reference image corresponding to the user input to determine if the user authentication has succeeded.

In operation 509, if the user authentication has succeeded by using the fingerprint image in operation 503, the electronic device may identify a rotation angle of the reference image used in the user authentication. For example, upon using the reference image rotated in unit of the reference interval for the user authentication in operation 503, the processor 120 may identify the rotation angle of the reference image.

In operation 511, the electronic device determines a user input direction based on the rotation angle of the reference image. For example, if the rotation angle of the reference image is 0°, the processor 120 may determine that the user input direction is the same direction as motion information of the electronic device. For example, if the rotation angle of the reference image is 180°, the processor 120 may determine that the user input direction is a direction opposite to the motion information of the electronic device.

If the fingerprint image corresponding to the user input has a smaller size than the reference image, the electronic device may extract at least one part of an area corresponding to the size of the fingerprint image from the reference image. The electronic device may detect the similarity between the fingerprint image and the extracted reference image.

If the user authentication has succeeded, the electronic device may provide an output in form of at least one of a message, a warning sound, a vibration, a warning light, etc., to indicate that a right to control an operation of the electronic device is activated.

Accordingly, the electronic device may detect the similarity with the fingerprint image for all rotatable rotation angles of the reference image in unit of a reference interval. In the presence of the similarity with the fingerprint image exceeding the reference similarity, the electronic device may determine that the user authentication using the fingerprint image has succeeded. In this case, the electronic device may determine the user input direction based on the rotation angle of the reference image capable of detecting a greatest similarity among similarities with the fingerprint image exceeding the reference similarity.

Figure 6:
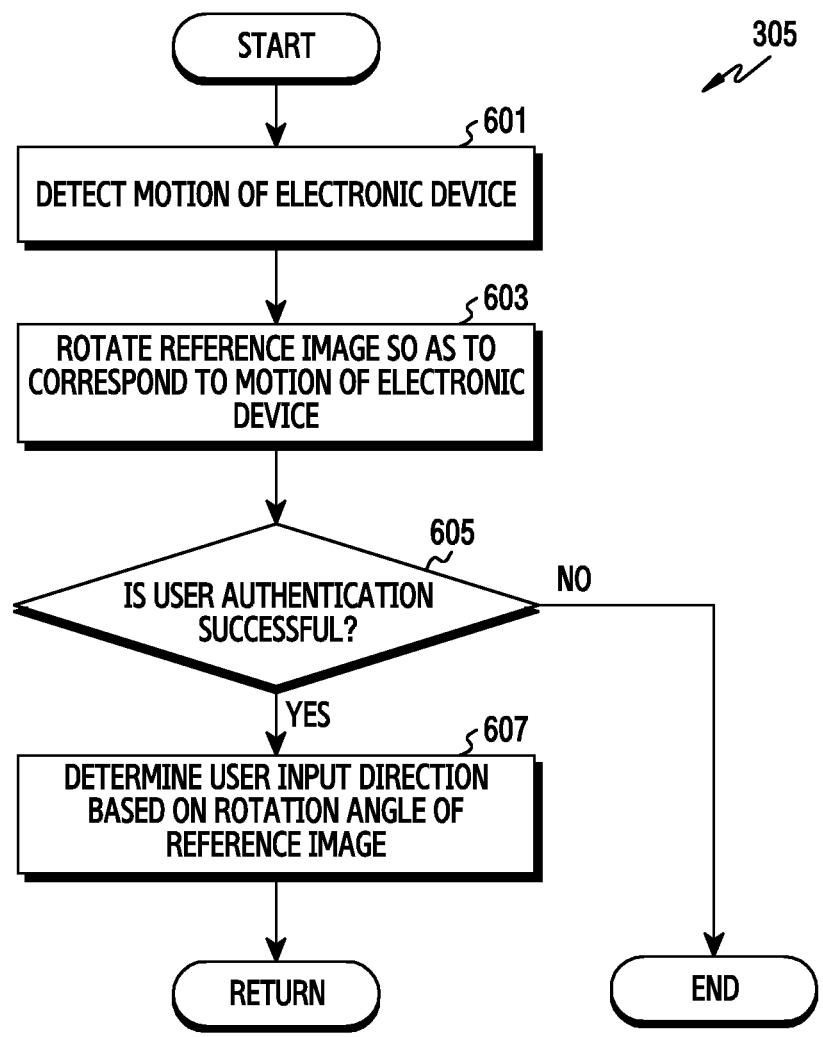
FIG. 6 is a flowchart illustrating a method of determining a user input direction in an electronic device according to an embodiment of the present disclosure.

FIG. 6 is a flowchart illustrating a method of determining a user input direction in an electronic device according to an embodiment of the present disclosure. For example, the method of FIG. 6 may be performed in operation 305 of FIG. 3. Hereinafter, the electronic device may include the electronic device 101 of FIG. 1A or 1B or at least a part (e.g., the processor 120) of the electronic device 101.

Referring to FIG. 6, in operation 601, upon detecting a fingerprint image corresponding to a user input (e.g., operation 303 of FIG. 3), the electronic device detects motion information of the electronic device. For example, the processor 120 may detect a motion information (e.g., a rotation angle) of the electronic device 101 by using sensor data detected via at least one of an acceleration sensor, gyro sensor, geomagnetic sensor, and gravity sensor operatively connected to the electronic device 101.

In operation 603, the electronic device rotates the reference image to correspond to the motion information of the electronic device. For example, the processor 120 may determine that a shape of a user's grip is changed based on the motion information of the electronic device 101. Accordingly, if the electronic device 101 rotates to the right by 30°, the electronic device may rotate the reference image to the left (e.g., in a reverse direction) by 30°.

In operation 605, the electronic device determines whether the user authentication has succeeded by comparing the rotated reference image and the fingerprint image corresponding to the user input. For example, if a similarity of the rotated reference image and the fingerprint image exceeds a reference similarity, the processor 120 may determine that the user authentication has succeeded. However, if the similarity of the rotated reference image and the fingerprint image is less than or equal to the reference similarity, the processor 120 may determine that the user authentication has failed. The processor 120 may compare the rotated reference image and the fingerprint image in unit of a pixel or compare feature points of the rotated reference image and the fingerprint to detect the similarity of the rotated reference image and the fingerprint image.

If the user authentication has failed, the electronic device may output user authentication failure information. For example, the processor 120 may output the user authentication failure information in form of at least one of a message, a warning sound, a warning light, etc.

In operation 607, if the user authentication using the fingerprint image has succeeded in operation 605, the electronic device determines a user input direction based on a rotation angle of a reference image used in the user authentication. For example, the processor 120 may determine the user input direction based on the rotation angle of the reference image irrespective of a motion shape of the electronic device.

Upon the failure of the user authentication using the reference image rotated based on the motion information of the electronic device, the electronic device may additionally perform the user authentication for the fingerprint image while rotating the reference image in unit of a reference interval.

Figure 7:
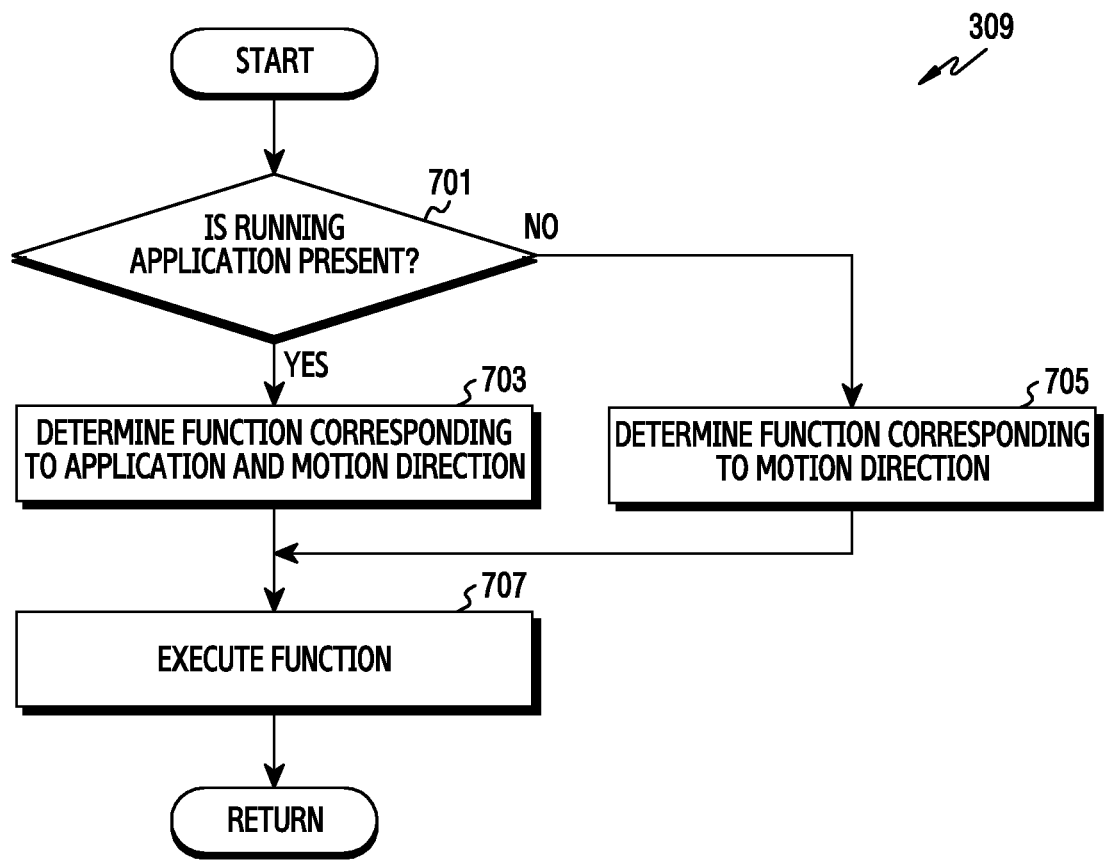
FIG. 7 is a flowchart illustrating a method of controlling an application in an electronic device according to an embodiment of the present disclosure.

FIG. 7 is a flowchart illustrating a method of controlling an application in an electronic device according to an embodiment of the present disclosure. For example, the method of FIG. 7 may be performed in operation 309 of FIG. 3. Hereinafter, the electronic device may include the electronic device 101 of FIG. 1A or 1B or at least a part (e.g., the processor 120) of the electronic device 101.

Referring to FIG. 7, in operation 701, upon detecting a motion of a user input (e.g., operation 307 of FIG. 3), the electronic device determines if there is an application running in the electronic device.

Figure 8A:
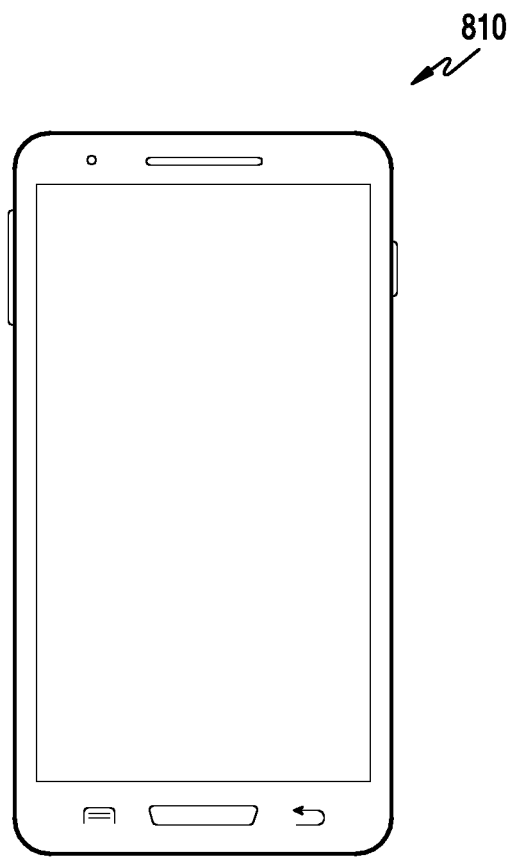
FIGS. 8A to 8C illustrate media control in an electronic device according to an embodiment of the present disclosure.
Figure 8B:
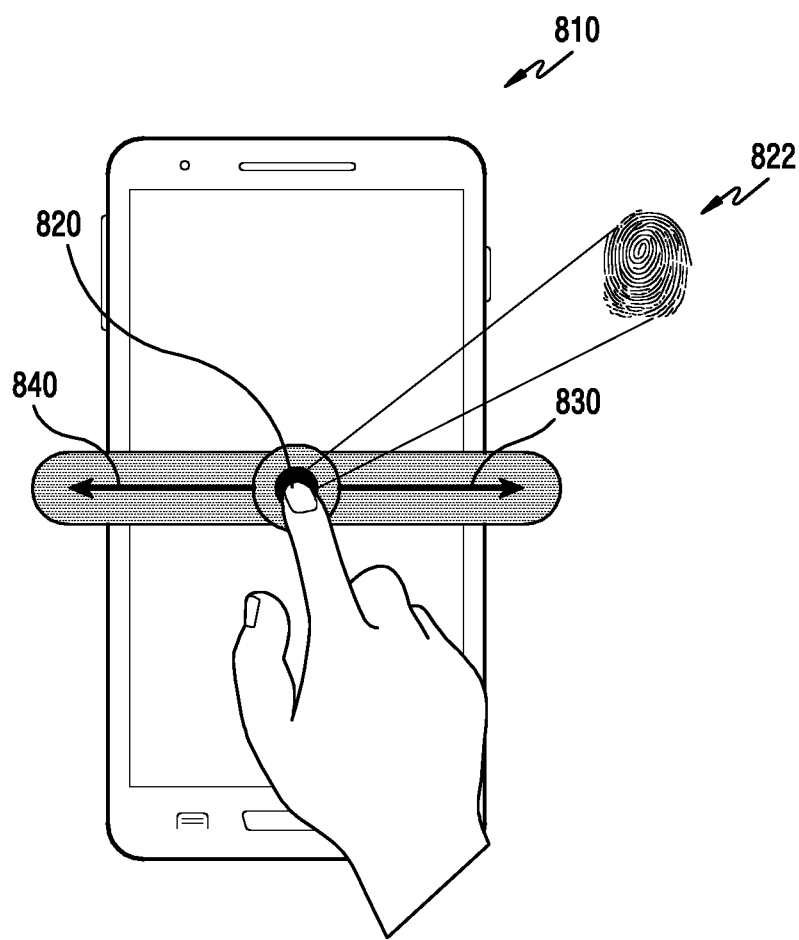
Figure 8C:
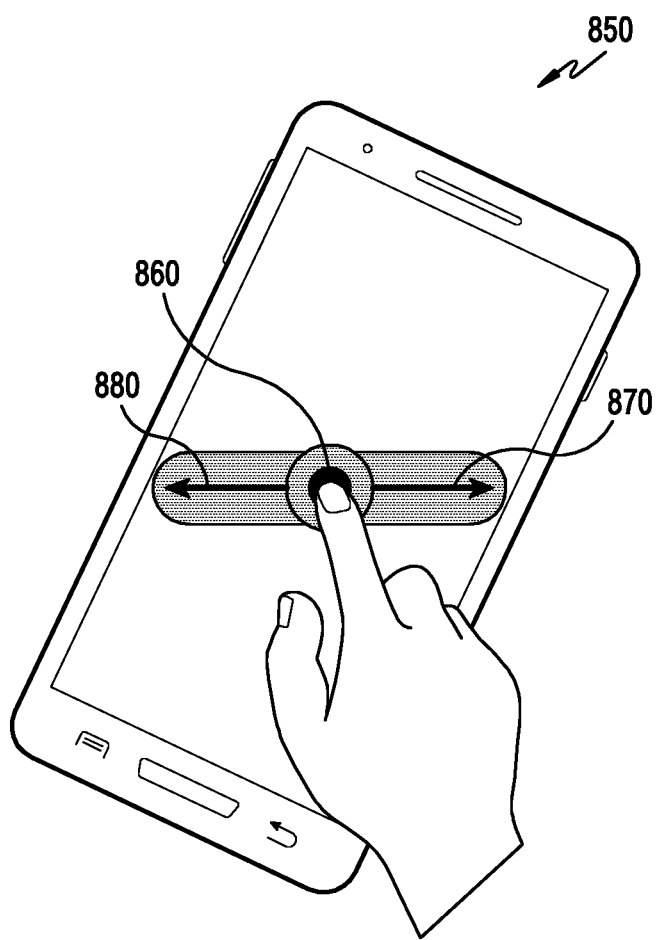

FIG. 8A to FIG. 8C illustrate controlling media in an electronic device according to an embodiment of the present disclosure.

Referring to FIGS. 8A and 8B, upon detecting the user input in a state 810 while a display module of the display is deactivated according to a low power mode, the processor 120 may determine a user input direction by using a fingerprint image 822 corresponding to the user input. Upon detecting the motion for the user input, the processor 120 may determine whether there is an application running in background in the low power mode.

Referring again to FIG. 7, in operation 703, in the presence of the application running in the electronic device, the electronic device determines a function corresponding to the application and the motion direction of the user input. For example, if a music playback application is running in the low power mode, the processor 120 may select a function list corresponding to the music playback application from at least one function list stored in the memory or the server.

Referring again to FIG. 8B, if the user input 820 moves to the right (830) based on the user input direction, the processor 120 may select a first function (e.g., fast forward) corresponding to the right direction from the function list. However, if the user input 820 moves to the left (840), the processor 120 may select a second function (e.g., rewind) corresponding to the left direction from the function list.

As illustrated in FIG. 8C, if a user input direction is the same as in FIG. 8B, the processor 120 may determine a function matched to the motion direction of the user input irrespective of motion states (e.g., a rotation state) 810 and 850 of the electronic device 101.

More specifically, as illustrated in FIG. 8C, when the electronic device 101 move from state 810 to state 850, if a user input 860 moves to the right (870), the processor 120 may select the first function corresponding to the right direction from the function list. If the user input 860 moves to the left (880), the processor 120 may select the second function corresponding to the left direction from the function list. Additionally or alternatively, if the user input direction is determined, the processor 120 may control the display 160 to display the function list for the music playback application running in the electronic device. The processor 120 may control the display 160 to display the function list so that the user can identify a playback control function mapped to each direction in which the user input can move.

Referring again to FIG. 7, in operation 705, in the absence of the application running in the electronic device in operation 701, the electronic device determines a function corresponding to the motion direction of the user input. For example, in the absence of the application running in background in the electronic device, the processor 120 may select a reference function list from at least one function list stored in the memory or the server.

Figure 9A:
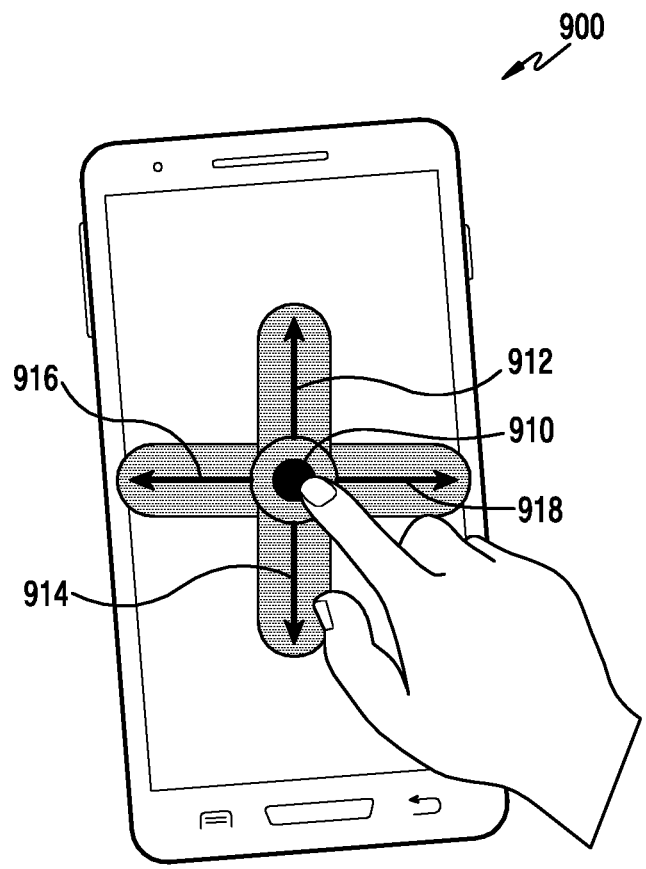
FIGS. 9A and 9B illustrate a camera service in an electronic device according to an embodiment of the present disclosure.
Figure 9B:
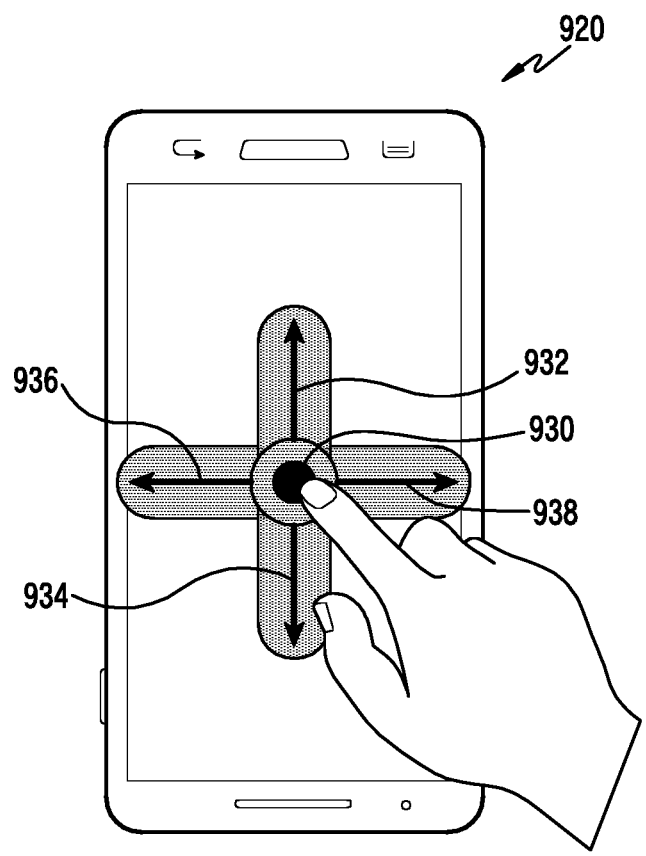

FIG. 9A to FIG. 9B illustrate providing a camera service in an electronic device according to an embodiment of the present disclosure.

Referring to FIG. 9A, in rotation state 900, if a user input 910 moves upward (912) based on a user input direction, the processor 120 may select a third function (e.g., activation of a first camera module) corresponding to the upward direction from the reference function list. If the user input 910 moves downward (914), the processor 120 may select a fourth function (e.g., activation of a second camera module) corresponding to the downward direction from the reference function list. If the user input 910 moves to the left (916), the processor 120 may select a fifth function (e.g., an image capture) corresponding the left direction from the reference function list. If the user input 910 moves to the right (918), the processor 120 may select a sixth function (e.g., a video capture) corresponding to the right direction from the reference function list.

Referring to FIG. 9B, if the user input direction is the same as in FIG. 9A, the processor 120 may determine a function matched to the motion direction of the user input irrespective of motion states (e.g., a rotation state) 900 and 920 of the electronic device 101.

More specifically, as illustrated in FIG. 9B, if a user input 930 moves upward (932), the processor 120 may select the third function corresponding to the upward direction from the reference function list. If the user input 930 moves downward (934), the processor 120 may select the fourth function corresponding to the downward direction from the reference function list. If the user input 930 moves to the left (936), the processor 120 may select the fifth function corresponding to the left direction from the reference function list. If the user input 930 moves to the right (938), the processor 120 may select the sixth function corresponding to the right direction from the reference function list.

Additionally or alternatively, the processor 120 may control the display 160 to display a motion direction to which the function is mapped and function information (e.g., an icon) mapped to the motion direction for reference by the user. Further, the processor 120 may output executable information in form of vibration or sound so that the user can recognize that when the function mapped to the motion direction of the user is executable.

Referring again to FIG. 7, in operation 707, the electronic device executes the function corresponding to the motion direction of the user input. For example, the processor 120 may provide control to play back content currently being played back in an application (e.g., a music playback program) operating in background so that the user input corresponds to the motion direction. The processor 120 may execute a specific function of an application (e.g., a camera application) in which the user input corresponds to the motion direction. The processor 120 may configure a control function of the electronic device so that the user input corresponds to the motion direction. Additionally or alternatively, the processor 120 may output execution information of a function corresponding to the motion direction of the user input in form of graphic, vibration, or sound so that a user can recognize an execution state of the function corresponding to the motion direction of the user input.

Figure 10:
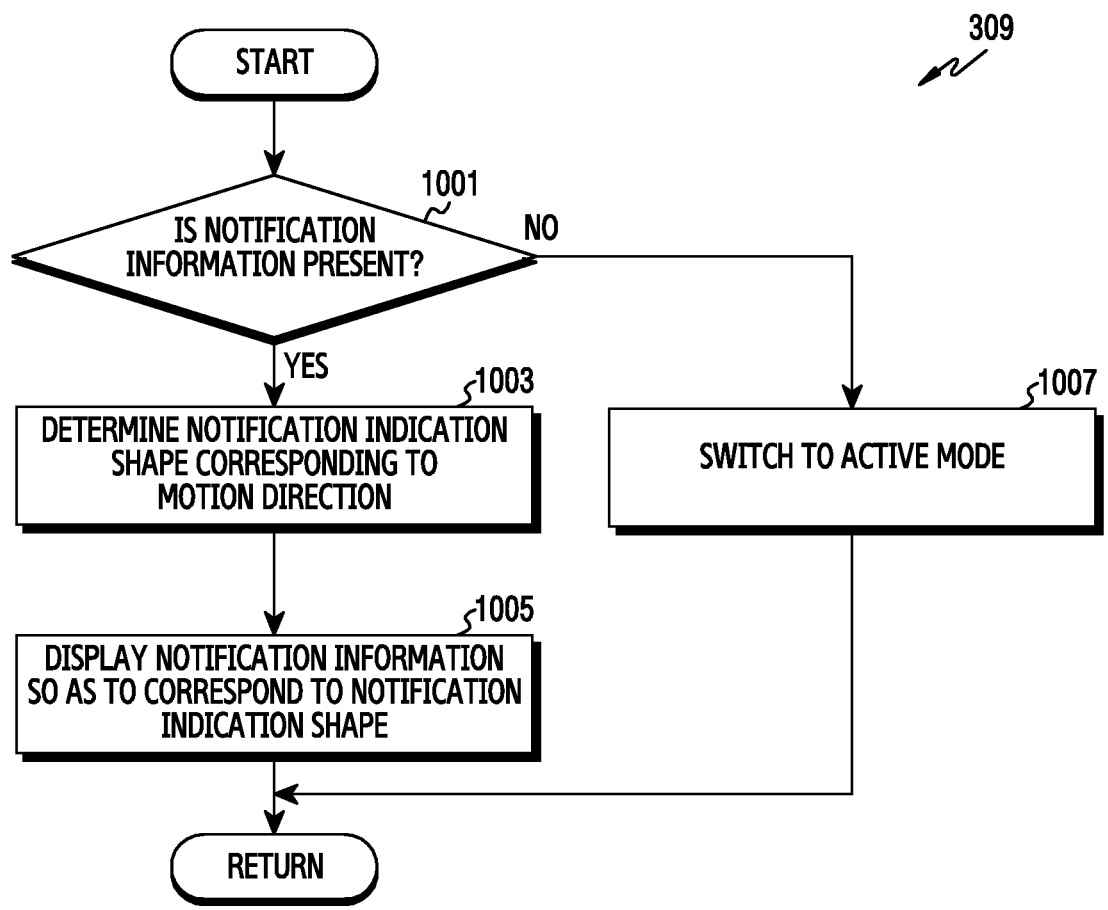
FIG. 10 is a flowchart illustrating a method of displaying notification information in an electronic device according to an embodiment of the present disclosure.

FIG. 10 is a flowchart illustrating a method of displaying notification information in an electronic device according to an embodiment of the present disclosure. For example, the method of FIG. 10 may be performed in operation 309 of FIG. 3. Hereinafter, the electronic device may include the electronic device 101 of FIG. 1A or 1B or at least a part (e.g., the processor 120) of the electronic device 101.

Referring to FIG. 10, in operation 1001, upon detecting a motion of a user input (e.g., operation 307 of FIG. 3), the electronic device determines if notification information is generated while operating in a low power mode.

Figure 11A:
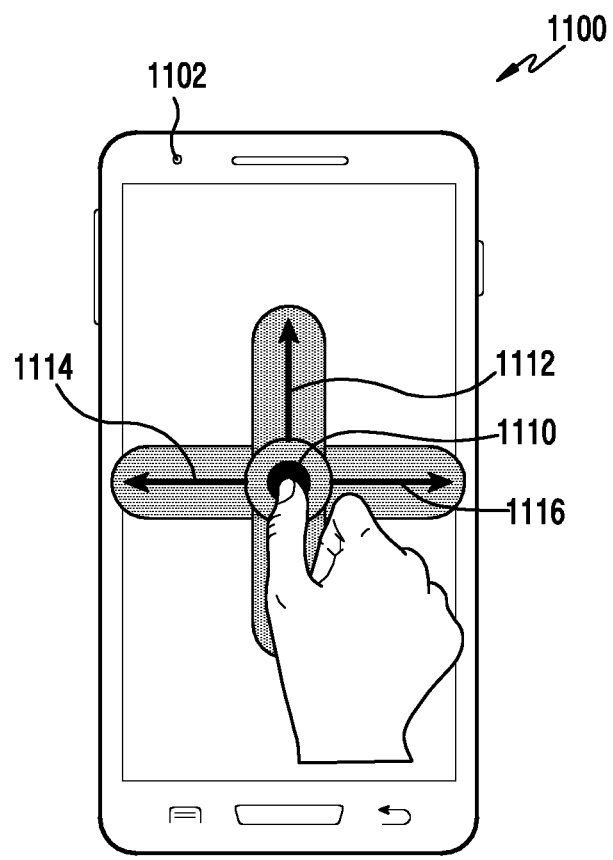
FIGS. 11A to 11D illustrate displaying notification information in an electronic device according to an embodiment of the present disclosure.

FIG. 11A to FIG. 11D illustrate displaying notification information in an electronic device according to an embodiments of the present disclosure. For example, if the notification information is generated while operating in the low power mode, as illustrated in FIG. 11A, the processor 120 may control an indicator 1102 to output generation information of the notification information. For example, the indicator 1102 is disposed to a front side of an electronic device 1100. For example, a processor 120 may differently configure a flickering pattern of the indicator 1102 to correspond to a type of the notification information. The notification information may include at least one of message reception, missed calls, mail reception, etc.

Referring again to FIG. 10, in operation 1003, in the presence of the notification information in operation 1001, the electronic device determines a notification indication shape corresponding to the motion direction of the user input. For example, upon detecting the motion of the user input, the processor 120 may determine the motion direction of the user input based on a user input direction. The processor 120 may select the notification indication shape corresponding to the motion direction of the user input from a pre-defined notification indication shape list. Additionally or alternatively, the processor 120 may control the display 160 to display the motion direction to which the notification display shape is mapped, so that it can be recognized by the user.

In operation 1005, the electronic device displays the notification information to correspond to the notification indication shape corresponding to the motion direction of the user input.

Figure 11B:

Referring to FIG. 11A, if a user input 1110 moves upward (1112), the processor 120 controls the display 160 to display detailed information 1120 regarding the most recently generated notification information as illustrated in FIG. 11B. For example, the processor 120 may control the display 160 to display a detailed screen (e.g., received mail content) of the notification information by executing an application corresponding to the most recently generated notification information.

Figure 11C:
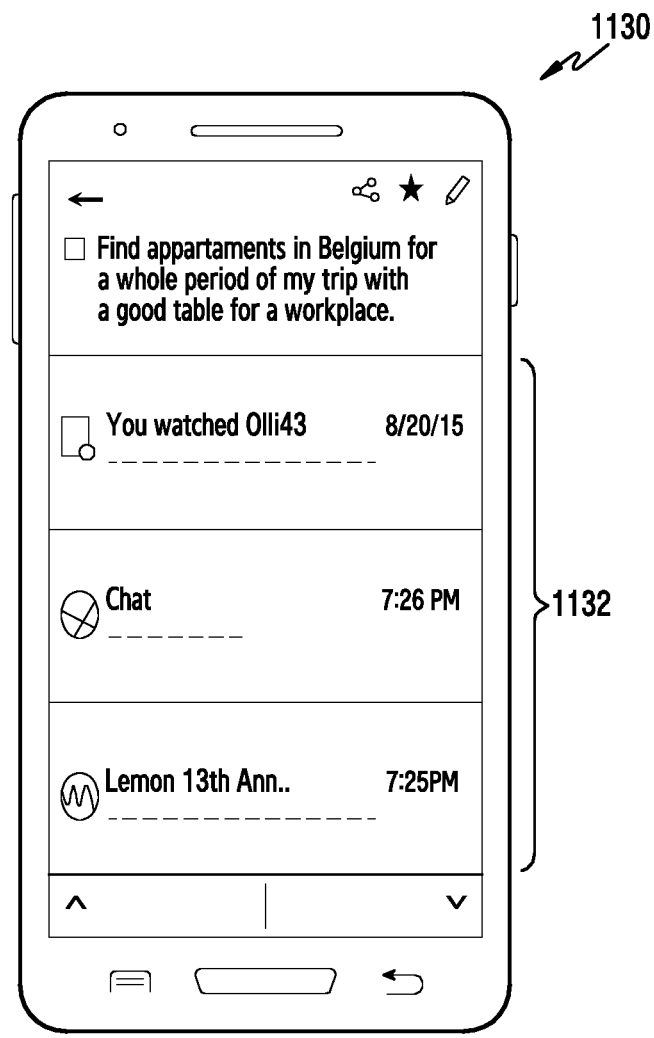

If the user input 1110 moves to the left (1114) in FIG. 11A, the processor 120 may control the display 160 to display summary information 1130 and remaining notification information list 1132 for the most recently generated notification information as illustrated in FIG. 11C.

Figure 11D:
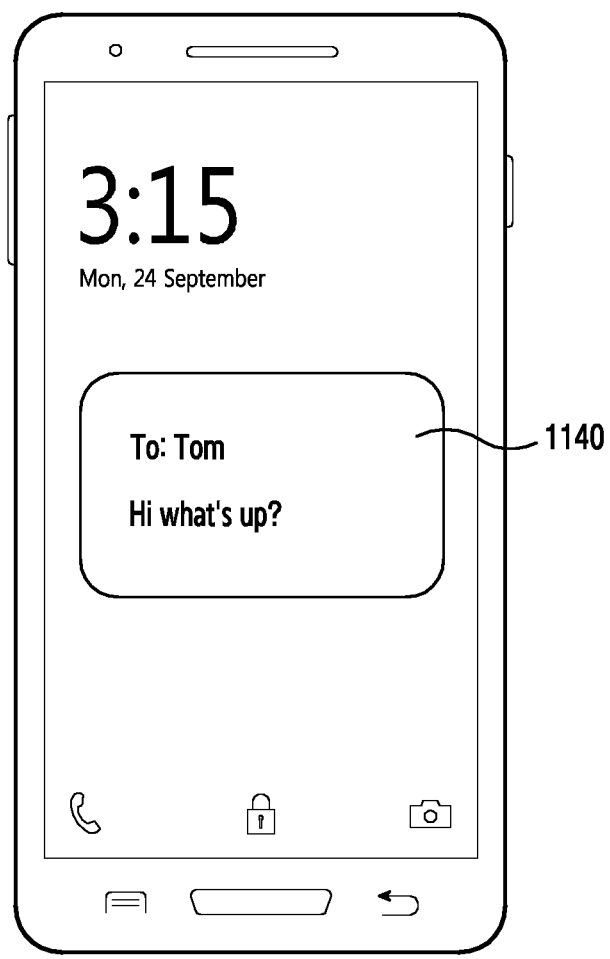

If the user input 1110 moves to the right (1116) in FIG. 11A, the processor 120 may control the display 160 to display notification summary information 1140 for notification information of an application having a top priority as illustrated in FIG. 11D. For example, a priority of an application may be set based on a usage frequency and usage time point of the application.

Referring again to FIG. 10, in operation 1007, in the absence of the notification information generated during operating in the low power mode in operation 1001, the electronic device switches the electronic device to an active mode. For example, when switched to the active mode, the processor 120 may control the display 160 to display an idle screen.

Figure 12:
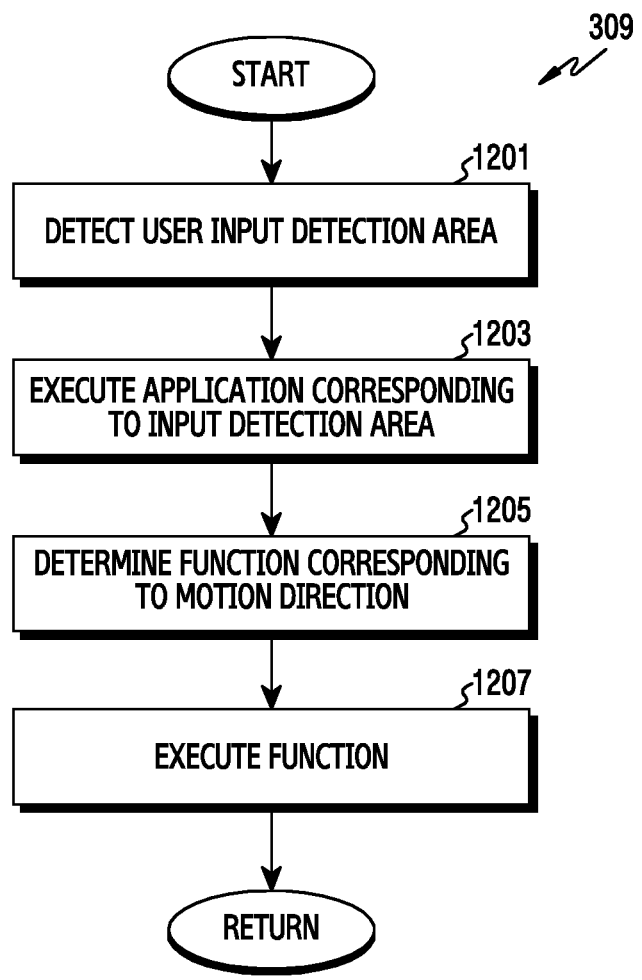
FIG. 12 is a flowchart illustrating a method of executing an application in an electronic device according to an embodiment of the present disclosure.

FIG. 12 is a flowchart illustrating a method of executing an application in an electronic device according to an embodiment of the present disclosure. For example, the method of FIG. 12 may be performed in operation 309 of FIG. 3. Hereinafter, the electronic device may include the electronic device 101 of FIG. 1A or 1B or at least a part (e.g., the processor 120) of the electronic device 101.

Referring to FIG. 12, in operation 1201, upon detecting a motion of a user input (e.g., operation 307 of FIG. 3), the electronic device detects an area in which the user input is detected on a display. For example, the processor 120 may determine at least one part of an area of the display 160 including the user input detected in operation 301 of FIG. 3.

In operation 1203, the electronic device executes an application corresponding to the area in which the user input is detected.

Figure 13A:
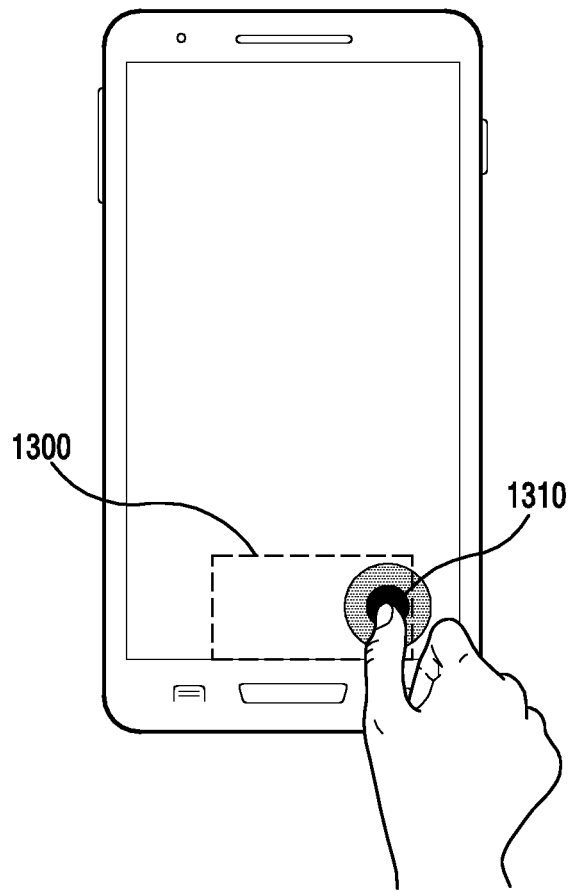
FIGS. 13A to 13C illustrate executing an application in an electronic device according to an embodiment of the present disclosure.
Figure 13B:
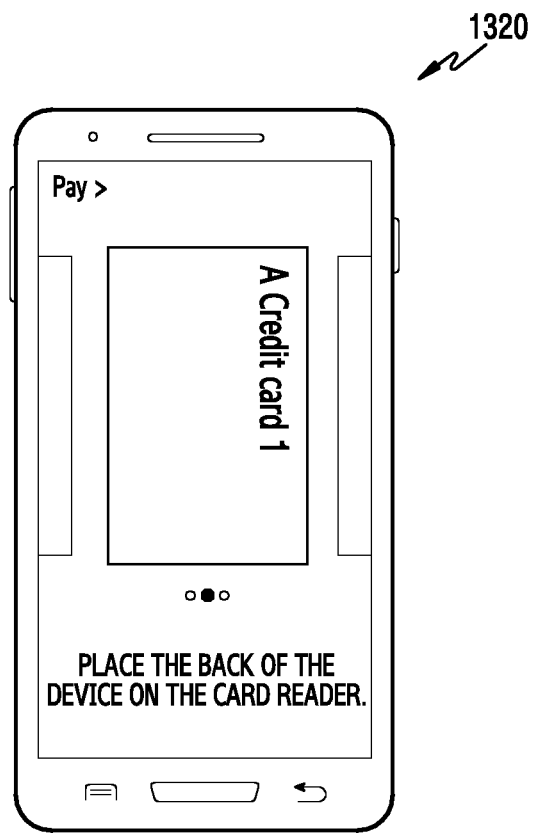
Figure 13C:
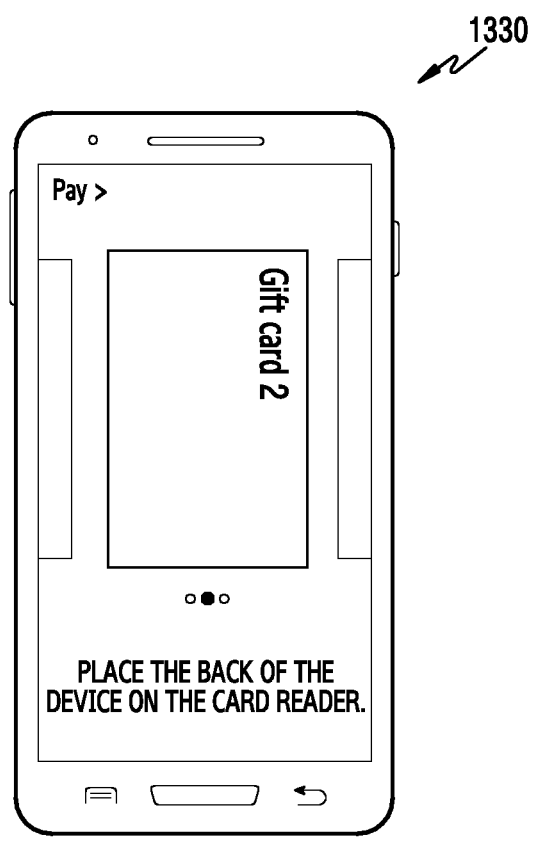

FIG. 13A to FIG. 13C illustrate executing an application in an electronic device according to an embodiment of the present disclosure. For example, as illustrated in FIG. 13A, upon detecting a user input 1310 for at least one part of an area 1300 in a lower portion of the display 160, the processor 120 may execute a payment application mapped to the at least one part of the area 1300. More specifically, the processor 120 may execute the payment application corresponding to the area 1300 in which the user input is detected at a time of detecting the motion of the user input in such a manner that the user authentication has succeeded at a time of determining a user input direction.

Referring again to FIG. 12, in operation 1205, the electronic device determines a function of an application corresponding to a motion direction of the user input. For example, upon executing the payment application, the processor 120 may select an electronic card corresponding to the motion direction of the user input. Additionally or alternatively, the processor 120 may control the display 160 to display a motion direction to which the electronic card is mapped for the user's reference. Alternatively, the processor 120 may provide an output in form of vibration or sound to indicate that the function of the application corresponding to the motion direction of the user input is executable. The electronic card may include a card for payment, a banking card, a membership management card, and/or a personal information management card. The card for payment may include at least one of a credit card, a bearer prepaid card (e.g., a gift card), a check card, and/or a debit card. The membership management card may include a membership card to provide a member management service such as a point usage, earning, etc. The banking card may include a cash card capable of making deposits and withdrawals through an automated teller machine. The personal information management card may include a resident card, a driver's license, and/or a passport capable of representing personal information of the user.

In operation 1207, the electronic device executes the function of the application corresponding to the motion direction of the user input. For example, the processor 120 may determine that the user authentication has succeeded at a time of determining a user input direction. Accordingly, The processor 120 may provide a payment service of a credit card corresponding to the motion direction of the user input without an additional user authentication procedure.

Referring to FIG. 13B, if the user input 1310 moves to the right, the processor 120 may skip an additional user authentication procedure and may provide a payment server 1320 of the credit card.

Referring to FIG. 13C, if the user input 1310 moves upward, the processor 120 may skip an additional user authentication procedure and may provide a payment service 1330 of a gift card.

Figure 14:
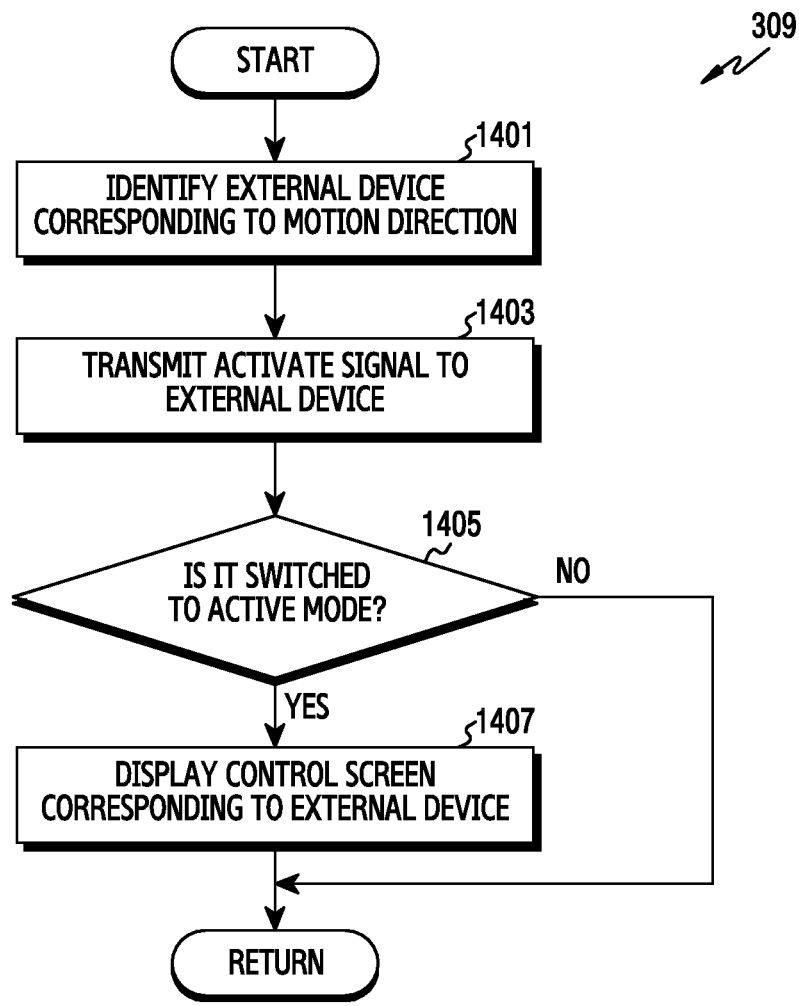
FIG. 14 is a flowchart illustrating a method of controlling an external device by an electronic device according to an embodiment of the present disclosure.

FIG. 14 is a flowchart illustrating a method of controlling an external device by an electronic device according to an embodiment of the present disclosure. For example, the method of FIG. 14 may be performed in operation 309 of FIG. 3. Hereinafter, the electronic device may include the electronic device 101 of FIG. 1A or 1B or at least a part (e.g., the processor 120) of the electronic device 101.

Referring to FIG. 14, in operation 1401, upon detecting a motion of a user input (e.g., operation 307 of FIG. 3), the electronic device identifies an external device corresponding to a motion direction of the user input. For example, upon detecting the motion of the user input, the processor 120 may determine the motion direction of the user input based on a user input direction. The processor 120 may select the external device corresponding to the motion direction of the user input from a list of external devices that can be controlled by the electronic device 101. For example, the external device may include an IoT device.

In operation 1403, the electronic device transmits an activate signal for switching the external device corresponding to the motion direction of the user input to an active mode. For example, the processor 120 may control the communication interface 170 to broadcast the activate signal corresponding to the external device to a surrounding area of the electronic device.

In operation 1405, the electronic device determines whether to switch the electronic device operating in a low power mode to the active mode. For example, the processor 120 may determine whether to switch the electronic device to the active mode based on a remaining battery level of the electronic device. For example, if the remaining battery level of the electronic device exceeds a reference value, the processor 120 may determine to switch the electronic device to the active mode.

The processor 120 may determine whether to switch the active mode for the electronic device based on whether there is an external device that can be controlled by the electronic device. The processor 120 may determine whether there is the external device that can be controlled by the electronic device based on a response signal for the activate signal. In the presence of an external device that can be controlled by the electronic device, the processor 120 may determine to switch the electronic device to the active mode.

In operation 1407, upon determining the switching to the active mode of the electronic device, the electronic device displays a control screen for controlling the external device corresponding to the motion direction of the user input. For example, upon detecting the user input through the control screen, the processor 120 may control the communication interface 170 to transmit control information corresponding to the user input to the external device.

Upon determining a user input direction in a low power mode, the electronic device may activate the display in order to display the list of the external devices that can be controlled by the electronic device and motion direction information of the user input to which each external device is mapped.

Figure 15:
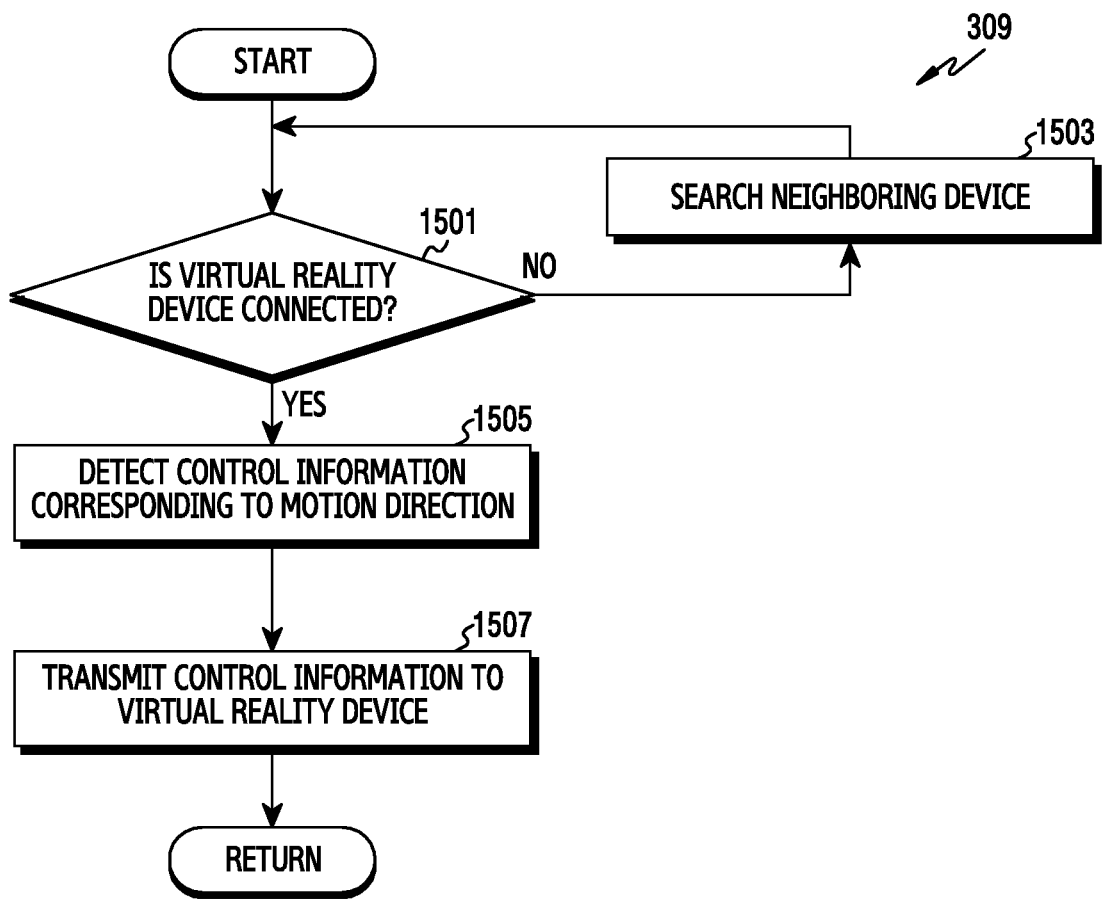
FIG. 15 is a flowchart illustrating a method of controlling a virtual reality device by an electronic device according to an embodiment of the present disclosure.

FIG. 15 is a flowchart illustrating a method of controlling a virtual reality device by an electronic device according to an embodiment of the present disclosure. For example, the method of FIG. 14 may be performed in operation 309 of FIG. 3. Hereinafter, the electronic device may include the electronic device 101 of FIG. 1A or 1B or at least a part (e.g., the processor 120) of the electronic device 101.

Referring to FIG. 15, in operation 1501, upon detecting a motion of a user input (e.g., operation 307 of FIG. 3), the electronic device determines if a virtual reality device is connected to the electronic device, e.g., in a wired or wireless manner.

In operation 1503, if the virtual reality device is not connected to the electronic device, the electronic device determines if a virtual reality device is near the electronic device by searching neighboring devices. For example, the processor 120 may control the communication interface 170 to transmit a signal for searching the neighboring devices. Upon receiving a response signal for a transmission signal, the processor 120 may determine that a virtual reality device corresponding to the response signal is adjacent to the electronic device 101.

In the presence of the virtual reality device adjacent to the electronic device, the electronic device determines if it is connected to the virtual reality device in operation 1501. For example, the processor 120 may control the display 160 to display a list of virtual reality devices found by searching the neighboring devices. The processor 120 may attempt a connection with any one virtual reality device selected by the user input from the virtual reality device list displayed on the display 160. The processor 120 may determine whether there is a virtual reality device having a connection history among at least one virtual reality device found by searching the neighboring devices. In the presence of the virtual reality device having the connection history, the processor 120 may attempt the connection with the virtual reality device. If the connection with the virtual reality device is not complete until a reference time elapses from a time of starting the connection with the virtual reality device, the processor 120 may determine that the connection with the virtual reality device has failed.

In operation 1505, if the virtual reality device is connected to the electronic device in operation 1501, the electronic device detects control information of the virtual reality device corresponding to the motion direction of the user input. For example, the processor 120 may retrieve a control information list corresponding to the virtual reality device from a memory or a server. The processor 120 may select control information corresponding to the motion direction of the user input from the control information list of the virtual reality device.

In operation 1507, the electronic device transmits the control information of the virtual reality device corresponding to the motion direction of the user input to the virtual reality device connected to the electronic device. In this case, the virtual reality device may provide a virtual reality service based on the control information provided from the electronic device. For example, if the user input moves to the right, the processor 120 may control the communication interface 170 to transmit a right motion command to the virtual reality device. The virtual reality device may update a virtual reality screen such that a viewpoint of the user moves to the right based on the right motion command provided from the electronic device 101.

Figure 16:
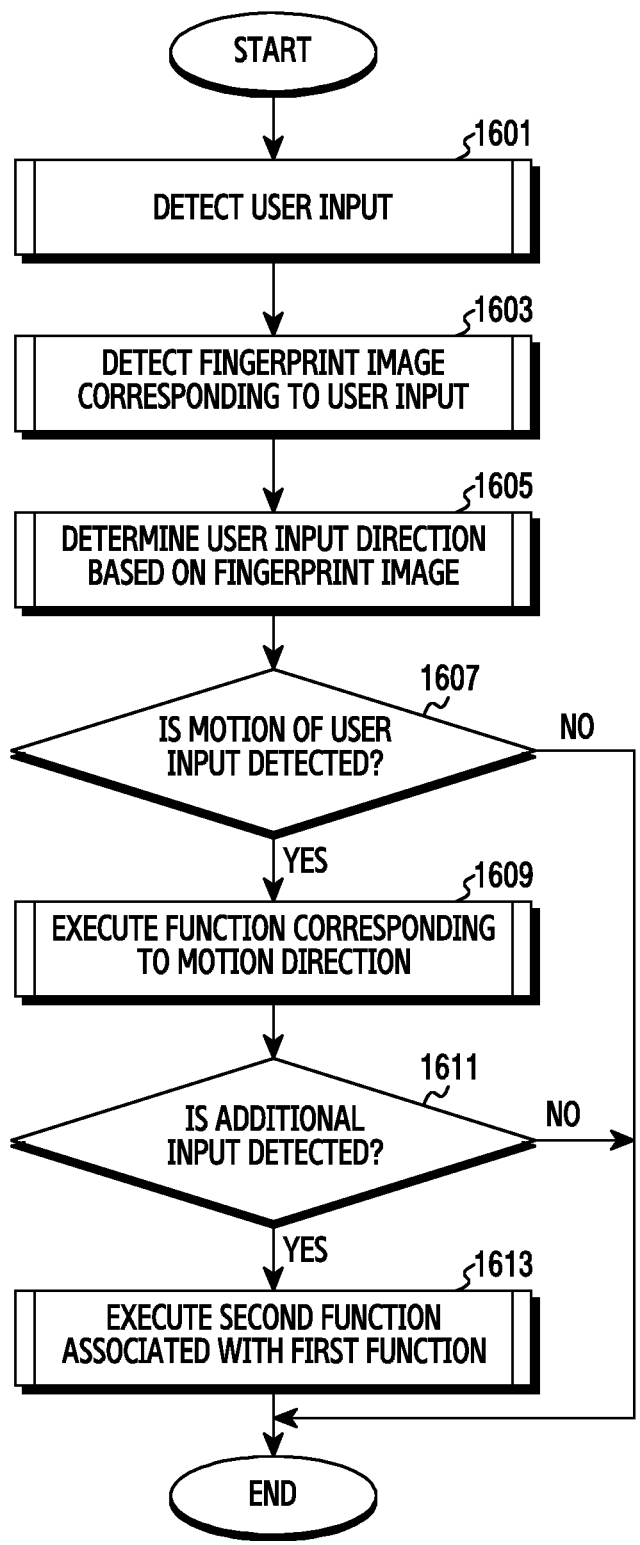
FIG. 16 is a flowchart illustrating a method of executing a function corresponding to a user input in an electronic device according to an embodiment of the present disclosure.

FIG. 16 is a flowchart illustrating a method of executing a function corresponding to a user input in an electronic device according to an embodiment of the present disclosure. Hereinafter, the electronic device may include the electronic device 101 of FIG. 1A or 1B or at least a part (e.g., the processor 120) of the electronic device 101.

Referring to FIG. 16, in operation 1601, the electronic device detects a user input caused by a contact of a display. For example, as illustrated in operations 401 to 403 of FIG. 4, the processor 120 may detect a touch input or a pressure input via a touch device or a pressure device in a low power mode. For example, a display panel of the display 160 is inactivated in the low power mode. The processor 120 may control at least one of the touch device and the pressure device to maintain an activate state in order to detect the user input in the low power mode.

In operation 1603, the electronic device detects a fingerprint image corresponding to the user input. For example, as illustrated in operation 405 of FIG. 4, the processor 120 may detect the fingerprint image corresponding to the user input by using the display panel including an electrostatic capacitance type touch panel or light receiving sensor. Upon detecting the user input, the processor 120 may activate a sensor for sensing a fingerprint (e.g., a touch panel or a display panel).

In operation 1605, the electronic device determines a user input direction based on the fingerprint image. For example, as illustrates in operations 501 to 511 of FIG. 5 and operations 601 to 607 of FIG. 6, the processor 120 may determine the user input direction based on a rotation angle of a reference image capable of detecting a similarity with the fingerprint image exceeding a reference similarity.

In operation 1607, the electronic device determines if a motion for the user input is detected. For example, the processor 120 determine if a coordinate of the user input (e.g., a touch coordinate or a pressure coordinate) is changed while the user input for detecting the fingerprint image is maintained.

In operation 1609, upon detecting the motion of the user input, the electronic device executes a first function corresponding to a motion direction of the user input. For example, as illustrated in operations 701 to 707 of FIG. 7, the processor 120 may execute the first function corresponding to the motion direction of the user input and information of an application running in the electronic device 101. For example, as illustrated in operations 1001 and 1007 of FIG. 10, the processor 120 may control the display 160 to display notification information in a notification indication shape corresponding to the motion direction of the user input. For example, as illustrated in operations 1201 to 1207 of FIG. 12, the processor 120 may provide control to perform a function corresponding to the motion direction of the user input in an application corresponding to an area of detecting the user input. For example, as illustrated in operations 1401 to 1407 of FIG. 14 or operations 1501 to 1507 of FIG. 15, the processor 120 may control an external device (e.g., an IoT device or a virtual reality device) corresponding to the motion direction of the user input. The processor 120 may determine the motion direction of the user input based on the user input direction.

In operation 1611, the electronic device determines if an additional input is detected while the first function is performed. For example, the processor 120 may determine if an additional user input is detected while the user input for performing the first function is maintained. For example, the processor 120 may determine if the additional user input is detected before a reference time elapses from a time at which the user input is released to perform the first function. The additional user input may include at least one of a touch area change, a pressure intensity change, the number of times of performing a pressure input, the number of touch inputs, and the number of pressure inputs.

In operation 1613, upon detecting the additional input, the electronic device may execute a second function associated with the first function based on the additional input. For example, if the user input moves to the right, as illustrated in FIG. 13B, the processor 120 may provide the payment service 1320 of the credit card.

Figure 17:
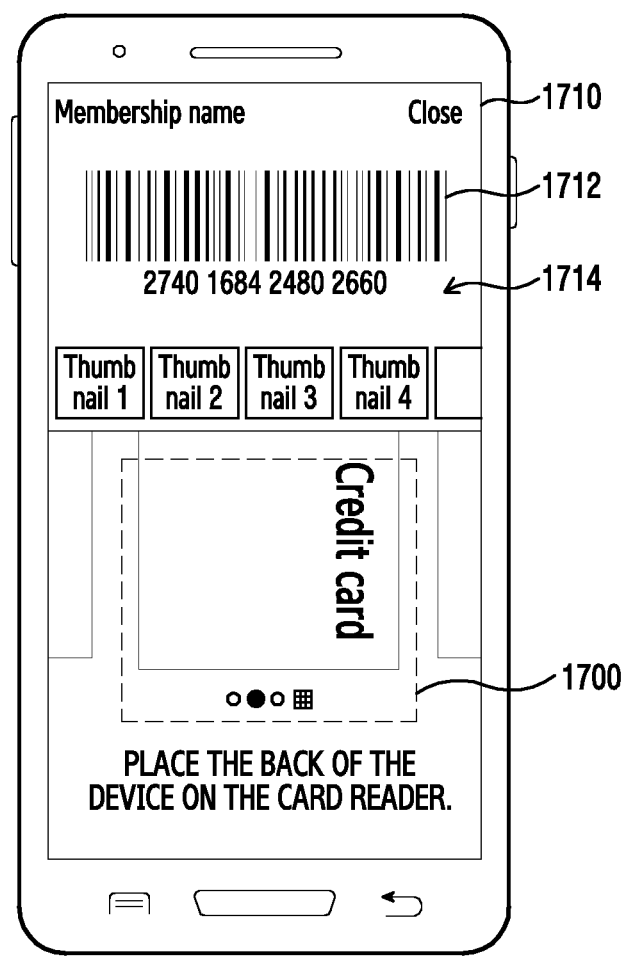
FIG. 17 illustrates executing a function corresponding to a user input in an electronic device according to an embodiment of the present disclosure.

FIG. 17 illustrates executing a function corresponding to a user input in an electronic device according to an embodiment of the present disclosure.

Referring to FIG. 17, upon detecting the additional user input, the processor 120 may control the display 160 to additionally display membership card information 1710 associated with a first credit card. The processor may control the display 160 to display that the membership card information 1710 overlaps with at least one part of an electronic card image 1700. The membership card information 1710 includes a management code 1712 corresponding to the membership card and a member management card icon (e.g., a thumbnail) 1714 registered to an application corresponding to a widget mode.

The electronic device 101 may select the second function to correspond to an additional input and the first function. For example, upon additionally detecting a pressure input one time in FIG. 13B, the processor 120 may additionally provide membership card information associated with the credit card 1320. If a pressure input is additionally detected two times continuously, the processor 120 may provide membership card information associated with a location at which a payment service is provided through a credit card.

Figure 18:
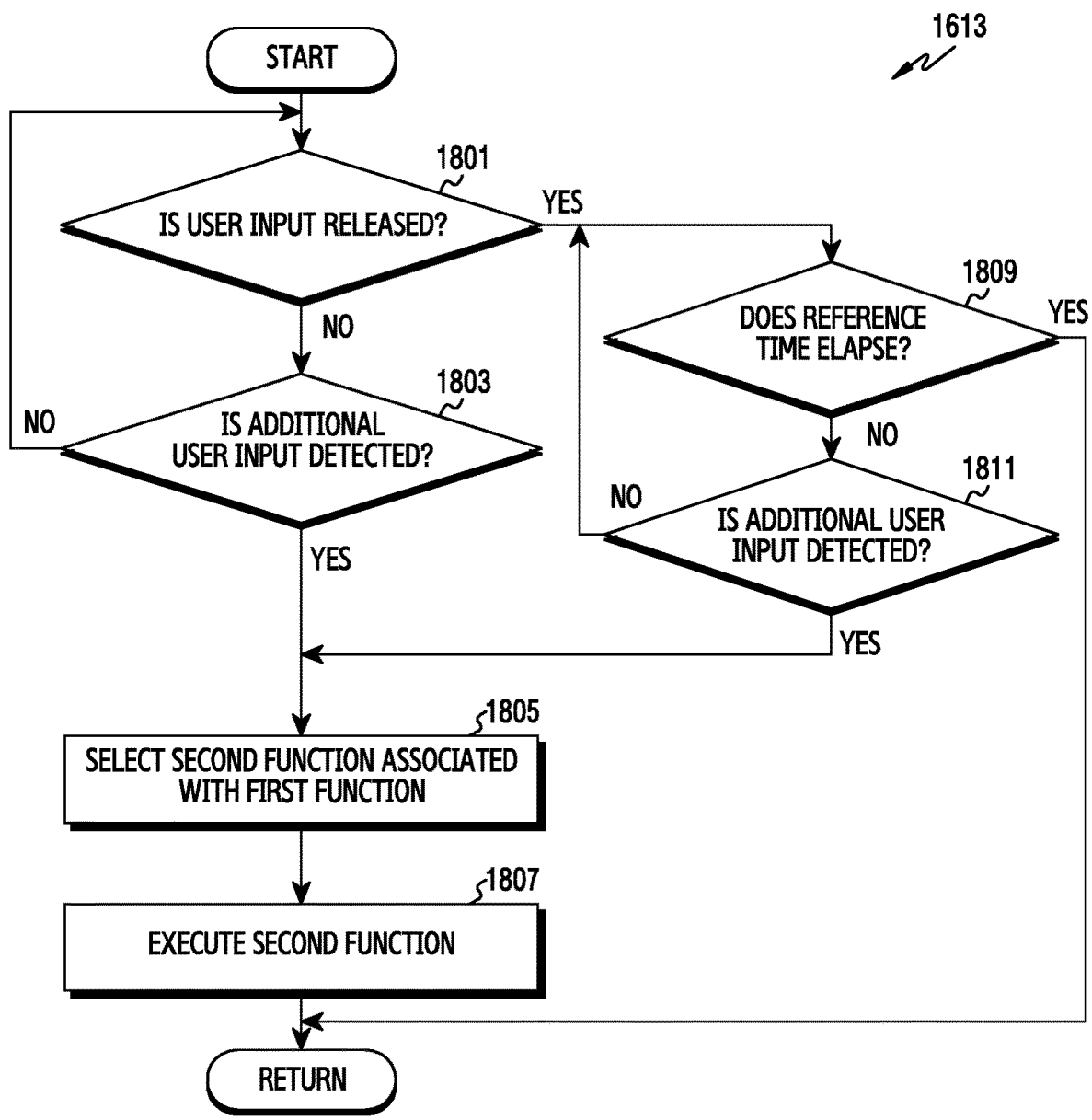
FIG. 18 is a flowchart illustrating a method of executing a function corresponding to an additional input in an electronic device according to an embodiment of the present disclosure.

FIG. 18 is a flowchart illustrating a method of executing a function corresponding to an additional input in an electronic device according to an embodiment of the present disclosure. For example, the method of FIG. 18 may be performed in operation 1603 of FIG. 16. Hereinafter, the electronic device may include the electronic device 101 of FIG. 1A or 1B or at least a part (e.g., the processor 120) of the electronic device 101.

Referring to FIG. 18, in operation 1801, if a first function is executed based on a motion direction of a user input (e.g., operation 1609 of FIG. 16), the electronic device determines if the user input is released. For example, if the first function is executed based on the motion direction of the user input caused by a contact of the display 160, the processor 120 may determine if the contact (e.g., a touch) of the display 160 is released by the user input.

In operation 1803, if the user input is maintained, the electronic device determines if an additional user input is detected. For example, if a touch area of the user input detected in operation 1601 is changed, the processor 120 may determine that the additional user input is detected. If a pressure intensity of the user input detected in operation 1601 is changed, the processor 120 may determine that the additional user input is detected. If a pressure input exceeding a reference intensity is detected at least one time by the user input detected in operation 1601, the processor 120 may determine that the additional user input is detected. The processor 120 may determine that an additional different user input (e.g., a touch input or a pressure input) is detected while the user input detected in operation 1601 is maintained.

If the additional user input is not detected in operation 1803, the electronic device determines again whether the user input is released in operation 1801.

In operation 1805, upon detecting the additional user input in operation 1803, the electronic device selects a second function associated with the first function based on the additional user input. For example, the processor 120 may control music content currently being played back in the electronic device based on the motion direction of the user input. Upon detecting the additional user input, the processor 120 may select additional information for the music content currently being played back. The additional information for the music content may include a title of the content, artist information associated with the content, different content information associated with the content, a lyric of the content, etc.

In operation 1807, the electronic device executes the second function selected based on the additional user input and the first function. For example, the processor 120 may provide control such that additional information of the music content is displayed on at least one part of an area of the display 160 while the music content is played back.

In operation 1809, if the user input is released in operation 1801, the electronic device determines if a reference time elapses. For example, the processor 120 may determine if a first reference time elapses from a time of releasing the user input. The processor 120 may determine if a second reference time elapses from a time of detecting the motion direction of the user input. The second reference time may be equal to or longer than the first reference time.

In operation 1811, if the reference time does not elapse in operation 1809, the electronic device determines if the additional user input is detected. For example, the processor 120 may determine if an additional user input is detected by at least any one of a change in a touch area, a change in a pressure intensity, an additional pressure input, a multi-touch input, and a multi-pressure input.

If the additional user input is not detected in operation 1811, the electronic device determines again if the reference time elapses in operation 1809.

If the additional user input is detected in operation 1811, the electronic device selects the second function associated with the first function based on the additional user input in operation 1805.

If the additional user input is not detected before the reference time elapses, the electronic device may determine not to execute a function corresponding the additional input. In this case, the electronic device may persistently execute the first function corresponding to a motion direction of the user input.

The electronic device may select the second function to correspond to a type of the additional input. For example, as illustrated in FIG. 8B or FIG. 8C, if one pressure input is additionally detected while music content is played back based on the motion direction of the user input, the processor may display the lyrics of the music content. If two pressure inputs are additionally detected continuously, the processor may provide different content information associated with the music content.

If the user input is released (e.g., operation 1801 of FIG. 18), the electronic device may determine that a function corresponding to the additional input is not executed.

Based on the additional input, the electronic device may control an external device selected based on the motion direction of the user input. For example, upon detecting the motion of the user input, the electronic device may transmit an active signal to an external device corresponding to the motion direction of the user input. Upon detecting an additional user input, the electronic device may display a control screen for controlling a corresponding external device. Upon detecting the additional user input, the electronic device may transmit control information of an external device corresponding to the additional user input to a corresponding external device. That is, the electronic device may control an operation of the external device by using the additional user input instead of using the control screen for controlling the external device.

An electronic device and an operating method thereof according to an embodiment of the present disclosure can provide various user interfaces using a fingerprint by providing various services such as a function execution or an application control of the electronic device based on the fingerprint information.

An electronic device and an operating method thereof according to an embodiment of the present disclosure can simplify a user interface for acquiring a fingerprint by acquiring fingerprint information corresponding to a user input in a low power mode.

The term "module" used in the present document includes a unit including hardware, software, or firmware, and may be interchangeably used with terms, such as a unit, a logic, a logical block, a component, a circuit, etc. A "module" may be an integrally constructed component or a minimum unit or one part thereof for performing one or more functions. A "module" may be mechanically or electrically implemented, and may include, for example, an Application-Specific Integrated Circuit (ASIC) chip, a Field-Programmable Gate Arrays (FPGAs), or a programmable-logic device, which is known or to be developed to perform certain operations.

At least one part of an apparatus (e.g., modules or functions thereof) or method (e.g., operations) according to an embodiment of the present disclosure may be implemented with an instruction stored in a computer-readable storage media (e.g., the memory 130). If the instruction is executed by one or more processors (e.g., the processor 120), the one or more processors may perform a function corresponding to the instruction. The computer-readable storage media may include a hard disk, a floppy disk, magnetic media (e.g., a magnetic tape), optical media (e.g., a compact disc-ROM (CD-ROM), a DVD, magnetic-optic media (e.g., a floptical disk)), an internal memory, etc. The instruction may include a code created by a compiler or a code executable by an interpreter. The module or programming module according to various embodiments may further include at least one or more elements among the aforementioned elements, or may omit some of them, or may further include additional other elements.

According to an embodiment of the present disclosure, operations performed by a module, programming module, or other elements may be executed in a sequential, parallel, repetitive, or heuristic manner. At least some of the operations may be executed in a different order or may be omitted, or other operations may be added.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
    a display; and
    a processor configured to:
        detect a contact between a finger and the display;
        while the contact between the finger and the display is maintained:
            detect a fingerprint image corresponding to the finger;
            determine an orientation of the finger based on an angle between the fingerprint image and a reference image corresponding to the fingerprint image;
            identify a motion of the finger that moves from a first position at which the fingerprint image is detected to a second position; and
            in response to identifying the motion of the finger, determine a motion direction of the finger user relative to the orientation of the finger; and
        execute a first function corresponding to the motion direction.

2. The electronic device of claim 1, further comprising:
    a touch device configured to detect a touch input; and
    a pressure device configured to detect a pressure input,
    wherein the processor is further configured to detect the contact based on at least one of the touch input and the pressure input via at least one of the touch device and the pressure device in a low power mode of the electronic device.

3. The electronic device of claim 2, wherein at least one part of the touch device and at least one part of the pressure device are disposed to the display in an overlapping manner.

4. The electronic device of claim 1, wherein the processor is further configured to detect the contact in a low power mode of the electronic device.

5. The electronic device of claim 1, wherein the processor is further configured to:
    detect a rotation angle of a reference image matched to the fingerprint image; and
    determine the orientation of the finger based on the rotation angle of the reference image.

6. The electronic device of claim 5, wherein the processor is further configured to detect the rotation angle of the reference image based on a feature point of the fingerprint image.

7. The electronic device of claim 1, wherein the processor is further configured to:
    perform a user authentication by using the fingerprint image;
    determine a rotation angle of a reference image used in the user authentication, in response to the user authentication being successful; and
    determine the orientation of the finger based on the rotation angle of the reference image.

8. The electronic device of claim 1, wherein the processor is further configured to execute the first function based on at least one of an application running in the electronic device, the motion direction, and a location of the finger.

9. The electronic device of claim 1, wherein the processor is further configured to execute a second function in response to an additional user input being detected while the first function is executed.

10. The electronic device of claim 9, wherein the processor is further configured to detect the additional user input based on a change in an input value of a user input corresponding to the contact or another user input.

11. A method of operating an electronic device, the method comprising:
    detecting a contact between a finger and a display of the electronic device;
    while the contact between the finger and the display is maintained:
        detecting a fingerprint image corresponding to the finger;
        determining an orientation of the finger based on an angle between the fingerprint image and a reference image corresponding to the finger;
        identifying a motion of the finger that starts from a first position at which the fingerprint image to a second position; and
        in response to identifying the motion of the finger, determining a motion direction of the finger relative to the orientation of the finger; and
    executing a first function corresponding to the motion direction.

12. The method of claim 11, wherein detecting the contact comprises detecting, in a low power mode of the electronic device, the contact based on at least one of a touch input and a pressure input via at least one of a touch device and a pressure device, which are operatively connected to the electronic device.

13. The method of claim 11, wherein detecting the fingerprint image comprises:
    detecting, in a low power mode of the electronic device, the contact on the display of the electronic device; and
    detecting the fingerprint image corresponding to the finger that is contacting the display.

14. The method of claim 11, wherein determining the orientation of the finger comprises:
    detecting a rotation angle of a reference image matched to the fingerprint image; and
    determining the orientation of the finger based on the rotation angle of the reference image.

15. The method of claim 14, wherein determining the rotation angle of the reference image comprises:

extracting a feature point of the fingerprint image; and
detecting the rotation angle of the reference image matched to the fingerprint image based on the feature point of the fingerprint image.

16. The method of claim 11, wherein determining the orientation of the finger comprises:
performing a user authentication by using the fingerprint image;
detecting a rotation angle of a reference image used in the user authentication, in response to the user authentication being successful; and
determining the orientation of the finger based on the rotation angle of the reference image.

17. The method of claim 11, wherein executing the first function comprises:
selecting a function list corresponding to an application running in the electronic device or a location of the finger;
selecting the first function corresponding to the motion direction of the finger from the function list; and
executing the first function.

18. The method of claim 11, wherein the first function comprises at least one of an application execution, a content playback control, a notification information display, and an external device control.

19. The method of claim 11, further comprising:
detecting an additional user input; and
executing a second function in response to detecting the additional user input.

20. The method of claim 19, wherein detecting the additional user input comprises detecting the additional user input based on a change in an input value of a user input corresponding to the contact or another user input during the first function is executed.

* * * * *